United States Patent
Katsumata

(10) Patent No.: US 9,716,839 B2
(45) Date of Patent: Jul. 25, 2017

(54) IMAGING APPARATUS AND METHOD OF CONTROLLING THE IMAGING APPARATUS

(71) Applicant: Sony Corporation, Tokyo (JP)

(72) Inventor: Shiori Katsumata, Kanagawa (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 14/132,044

(22) Filed: Dec. 18, 2013

(65) Prior Publication Data

US 2014/0104462 A1    Apr. 17, 2014

Related U.S. Application Data

(63) Continuation of application No. 13/039,006, filed on Mar. 2, 2011, now Pat. No. 8,675,094.

(30) Foreign Application Priority Data

Mar. 10, 2010 (JP) ................................. 2010-053140

(51) Int. Cl.
| | |
|---|---|
| *H04N 5/235* | (2006.01) |
| *H04N 5/232* | (2006.01) |
| *G03B 7/097* | (2006.01) |

(52) U.S. Cl.
CPC ........... *H04N 5/2353* (2013.01); *G03B 7/097* (2013.01); *H04N 5/235* (2013.01); *H04N 5/2357* (2013.01); *H04N 5/23248* (2013.01); *G03B 2217/185* (2013.01)

(58) Field of Classification Search
CPC ... H04N 5/23293; H04N 5/235; H04N 5/2353

USPC .................................................. 348/362–364
See application file for complete search history.

(56) References Cited

U.S. PATENT DOCUMENTS

| | | | | | |
|---|---|---|---|---|---|
| 5,915,133 | A | * | 6/1999 | Hirai .......................... | G02B 7/28 396/147 |
| 6,630,960 | B2 | | 10/2003 | Takahashi et al. | |
| 8,243,165 | B2 | | 8/2012 | Fujiwara et al. | |
| 8,675,094 | B2 | * | 3/2014 | Katsumata ......... | H04N 5/23248 348/226.1 |
| 2001/0026683 | A1 | * | 10/2001 | Morimoto ................ | G02B 7/28 396/89 |
| 2003/0026607 | A1 | * | 2/2003 | Okisu ................ | H04N 5/23245 396/213 |

(Continued)

FOREIGN PATENT DOCUMENTS

| | | |
|---|---|---|
| JP | 07-298130 | 11/1995 |
| JP | 11-155107 | 6/1999 |

(Continued)

*Primary Examiner* — Timothy J Henn
(74) *Attorney, Agent, or Firm* — Wolf, Greenfield & Sacks, P.C.

(57) ABSTRACT

An imaging apparatus includes: an imaging section that captures an image of a subject; a detection section that detects flicker of a through-the-lens image as a moving image of the subject which is obtained by image capturing of the imaging section; and a control section that, when the detection section detects the flicker, controls an aperture, a shutter speed, and a gain on the basis of through-the-lens image control values as control values for controlling the aperture, the shutter speed, and the gain so as to preferentially suppress occurrence of flicker in the through-the-lens image.

8 Claims, 10 Drawing Sheets

(56) References Cited

U.S. PATENT DOCUMENTS

| | | |
|---|---|---|
| 2006/0104626 A1 | 5/2006 | Hisamitsu |
| 2007/0189753 A1 | 8/2007 | Koguchi et al. |
| 2008/0291293 A1 | 11/2008 | Kawamura |
| 2009/0128683 A1 | 5/2009 | Matsumoto |
| 2010/0079655 A1* | 4/2010 | Eom .................. G03B 17/20 |
| | | 348/333.05 |
| 2011/0221930 A1 | 9/2011 | Katsumata |

FOREIGN PATENT DOCUMENTS

| | | |
|---|---|---|
| JP | 2002-094878 A | 3/2002 |
| JP | 2004-096392 A | 3/2004 |
| JP | 2006-074530 A | 3/2006 |
| JP | 2007-060327 A | 3/2007 |
| JP | 2009-130531 A | 6/2009 |

\* cited by examiner

IMAGING APPARATUS AND METHOD OF CONTROLLING THE IMAGING APPARATUS

RELATED APPLICATIONS

This is a continuation of U.S. application Ser. No. 13/039,006, entitled "IMAGING APPARATUS THAT PREFERENTIALLY SUPPRESSES OCCURRENCE OF FLICKER IN A THROUGH-THE-LENS IMAGE AND METHOD AND COMPUTER PROGRAM FOR CONTROLLING THE IMAGING APPARATUS," filed on Mar. 2, 2011, which is incorporated herein by reference in its entirety. Foreign priority benefits are claimed under 35 U.S.C. §119(a)-(d) or 35 U.S.C. §365(b) of Japanese application number 2010-053140, filed Mar. 10, 2010.

BACKGROUND OF THE INVENTION

1. Field of the Invention

The present invention relates to an imaging apparatus and a method of controlling the imaging apparatus. In particular, the invention relates to an imaging apparatus and a method of controlling the imaging apparatus capable of obtaining a through-the-lens image closer to an image at the time of captured-image storage.

2. Description of the Related Art

In recent years, in accordance with the spread of digital cameras, there have been widely used methods of displaying a taken image (a through-the-lens image), which is taken from an imaging element, on a monitor provided on a digital camera before captured-image storage for storing an image, which is obtained by capturing an image of a subject in the imaging element, in a storage unit.

Generally, with digital cameras, when a user presses a shutter button, at a predetermined timing (a captured-image storage timing) corresponding to the instruction, an image which is taken from the imaging element is stored as a captured image in a memory or the like. Through-the-lens image display is a function of displaying the image, which is taken from the imaging element, as a through-the-lens image on the monitor before the timing of the captured-image storage. The user determines the composition, timing, setting, and the like while checking the through-the-lens image, and performs captured-image storage (for example, presses the shutter button).

That is, such a through-the-lens image is an image for allowing a user to check the finish of the captured image before performing the captured-image storage. Accordingly, in the through-the-lens image, it is preferable to reproduce the finish of the captured image as accurately as possible.

For example, in order to reproduce a depth of field or the like through an aperture stop, it is necessary to display the through-the-lens image by using an aperture the same as an aperture at the time of the captured-image storage. In this case, it is necessary to adjust the aperture to an exposure which is appropriate in a state where the aperture is fixed. Hence, it is also necessary to change parameters for performing other exposure controls such as an exposure time and an ISO (International Organization for Standardization) sensitivity (gain).

However, under certain circumstances where some light sources are used, there is a concern about occurrence of a flickering phenomenon, which is referred to as flicker, in the through-the-lens image. For example, when an image of a subject is captured under a light source, which flickers at a predetermined frequency, such as a fluorescent light, in accordance with a frame rate or an exposure time thereof, the luminance of the subject temporally changes in the through-the-lens image. Accordingly, there is a concern about the flickering phenomenon caused by the change.

The finish of the through-the-lens image, in which such flicker occurs, becomes different from the captured image. Consequently, in the through-the-lens image in which the flicker occurs, it is difficult for a user to figure out the finish of the captured image.

For this reason, in order to suppress the occurrence of such flicker, there has been proposed a method of adjusting the frame rate of the camera in consideration of the frequency of a light source (for example, refer to Japanese Unexamined Patent Application Publication Nos. 11-155107 and 07-298130).

For example, there is a method of setting the shutter speeds (the exposure times) of the camera to discrete values so as to make the shutter speeds equal to the integer multiples of the frequency of the light source. In this case, the allowable ranges of parameters for controlling exposure are restricted. Therefore, there is a concern that the range of the luminance area in which the automatic exposure control is available may be restricted.

Moreover, for example as described above, when the user controls the aperture in order to adjust the depth of field, the number of controllable parameters decreases. Accordingly, there is a concern that the range of the luminance area in which the automatic exposure control is available may be more greatly restricted.

For this reason, there has been proposed a method of performing exposure control so as not to cause flicker before the captured-image storage and performing the exposure control regardless of occurrence of flicker at the time of the captured-image storage (for example, refer to Japanese Unexamined Patent Application Publication No. 2006-74530).

SUMMARY OF THE INVENTION

However, in the case of the method disclosed in Japanese Unexamined Patent Application Publication No. 2006-74530, a method of controlling the exposure of the through-the-lens image is different from a method of controlling the exposure of the captured image. Accordingly, there is a concern that the finish of the captured image may not be reproduced in the through-the-lens image. That is, there is a concern that it may be difficult for a user to check the finish of the captured image through the through-the-lens image.

The invention has been made in consideration of the above situation, and addresses the issue of obtaining the through-the-lens image closer to the image at the time of image capturing.

According to an embodiment of the invention, there is provided an imaging apparatus including: an imaging section that captures an image of a subject; a detection section that detects flicker of a through-the-lens image as a moving image of the subject which is obtained by image capturing of the imaging section; and a control section that, when the detection section detects the flicker, controls an aperture, a shutter speed, and a gain on the basis of through-the-lens image control values as control values for controlling the aperture, the shutter speed, and the gain so as to preferentially suppress occurrence of flicker in the through-the-lens image.

It is preferable that the imaging apparatus should further include a determination section that determines whether or not to make a user check an effect of the aperture on the basis of the user's operation or a mode of captured-image storage for obtaining a captured image as a still image by allowing the imaging unit to capture the image of the subject. It is also preferable that, when the determination section determines to make the user check the effect of the aperture, the control section should control the aperture, the shutter speed, and the gain on the basis of the through-the-lens image control values, regardless of a detection result of the flicker obtained by the detection section.

It is preferable that the imaging apparatus should further include a correction section that, when the detection section does not detect the flicker, corrects the through-the-lens image control values on the basis of captured-image storage control values as control values, which are for controlling the aperture, the shutter speed, and the gain, for captured-image storage for obtaining a captured image as a still image by allowing the imaging section to capture the image of the subject, regardless of an occurrence of flicker in the through-the-lens image. It is also preferable that the control section should control the aperture, the shutter speed, and the gain on the basis of the through-the-lens image control values which are corrected by the correction section.

It is preferable that the imaging apparatus should further include: a through-the-lens image control value calculation section that calculates the through-the-lens image control values; and a captured-image storage control value calculation section that calculates the captured-image storage control values. It is also preferable that, when the detection section detects the flicker, the control section should control the aperture, the shutter speed, and the gain on the basis of the through-the-lens image control values which are calculated by the through-the-lens image control value calculation section. It is also preferable that, when the detection section does not detect the flicker, the correction section should correct the through-the-lens image control values on the basis of the captured-image storage control values which are calculated by the captured-image storage control value calculation section, and the control section should control the aperture, the shutter speed, and the gain on the basis of the through-the-lens image control values which are corrected by the correction section.

It is preferable that the imaging apparatus should further include a determination section that determines whether or not a user wants to check an effect of the aperture on the basis of the user's operation or the mode of the captured-image storage. It is also preferable that, when the determination section determines that the user wants to check the effect of the aperture, the correction section should correct the through-the-lens image control values on the basis of the captured-image storage control values which are calculated by the captured-image storage control value calculation section, and the control section should control the aperture, the shutter speed, and the gain on the basis of the through-the-lens image control values which are corrected by the correction section.

It is preferable that, when the detection section does not detect the flicker, the control section should control the aperture, the shutter speed, and the gain on the basis of captured-image storage control values as control values, which are for controlling the aperture, the shutter speed, and the gain, for captured-image storage for obtaining a captured image as a still image by allowing the imaging section to capture the image of the subject, regardless of an occurrence of flicker in the through-the-lens image.

It is preferable that the imaging apparatus should further include: a through-the-lens image control value calculation section that calculates the through-the-lens image control values; and a captured-image storage control value calculation section that calculates the captured-image storage control values. It is also preferable that, when the detection section detects the flicker, the control section should control the aperture, the shutter speed, and the gain on the basis of the through-the-lens image control values which are calculated by the through-the-lens image control value calculation section. It is also preferable that, when the detection section does not detect the flicker, the control section should control the aperture, the shutter speed, and the gain on the basis of the captured-image storage control values which are calculated by the captured-image storage control value calculation section.

It is preferable that the imaging apparatus should further include a determination section that determines whether or not a user wants to check an effect of the aperture on the basis of the user's operation or the mode of the captured-image storage. It is also preferable that, when the determination section determines that the user wants to check the effect of the aperture, the control section controls the aperture, the shutter speed, and the gain on the basis of the captured-image storage control values.

According to an embodiment of the invention, there is provided a method of controlling an imaging apparatus including the steps of: detecting, through a detection section of the imaging apparatus, flicker of a through-the-lens image as a moving image of the subject which is obtained by image capturing; and controlling, through a control section of the imaging apparatus, an aperture, a shutter speed, and a gain on the basis of through-the-lens image control values as control values for controlling the aperture, the shutter speed, and the gain so as to preferentially suppress occurrence of flicker in the through-the-lens image, when the flicker is detected.

According to an embodiment of the invention, there is provided a program for causing a computer to function as: a detection section that detects flicker of a through-the-lens image as a moving image of the subject which is obtained by image capturing; and a control section that controls an aperture, a shutter speed, and a gain on the basis of through-the-lens image control values as control values for controlling the aperture, the shutter speed, and the gain so as to preferentially suppress an occurrence of flicker in the through-the-lens image, when the detection section detects the flicker.

According to an embodiment of the invention, there is provided an imaging apparatus including: an imaging section that captures an image of a subject; a determination section that determines whether or not to make a user check an effect of the aperture on the basis of the user's operation or a mode of captured-image storage for obtaining a captured image as a still image by allowing the imaging unit to capture the image of the subject; and a control section that, when the determination section determines to make the user check the effect of the aperture, controls an aperture, a shutter speed, and a gain on the basis of through-the-lens image control values as control values for controlling the aperture, the shutter speed, and the gain so as to preferentially suppress an occurrence of flicker in a through-the-lens image as a moving image of the subject which is obtained by image capturing of the imaging section.

It is preferable that the imaging apparatus should further include a correction section that, when the determination section determines not to make the user check the effect of the aperture, corrects the through-the-lens image control values on the basis of captured-image storage control values as control values, which are for controlling the aperture, the shutter speed, and the gain, for captured-image storage, regardless of an occurrence of flicker in the through-the-lens image. It is also preferable that the control section should control the aperture, the shutter speed, and the gain on the basis of the through-the-lens image control values which are corrected by the correction section.

It is preferable that, when the determination section determines not to make the user check the effect of the aperture, the control section should control the aperture, the shutter speed, and the gain on the basis of captured-image storage control values as control values, which are for controlling the aperture, the shutter speed, and the gain, for captured-image storage, regardless of an occurrence of flicker in the through-the-lens image.

According to an embodiment of the invention, there is provided a method of controlling an imaging apparatus including the steps of: determining, through a determination section of the imaging apparatus, whether or not to make a user check an effect of the aperture on the basis of the user's operation or a mode of captured-image storage for obtaining a captured image as a still image by capturing an image of a subject; and controlling, through a control section of the imaging apparatus, an aperture, a shutter speed, and a gain on the basis of through-the-lens image control values as control values for controlling the aperture, the shutter speed, and the gain so as to preferentially suppress an occurrence of flicker in a through-the-lens image as a moving image of the subject which is obtained by image capturing, when it is determined to make the user check the effect of the aperture.

According to an embodiment of the invention, there is provided a program for causing a computer to function as: a determination section that determines whether or not to make a user check an effect of the aperture on the basis of the user's operation or a mode of captured-image storage for obtaining a captured image as a still image by capturing an image of a subject; and a control section that controls an aperture, a shutter speed, and a gain on the basis of through-the-lens image control values as control values for controlling the aperture, the shutter speed, and the gain so as to preferentially suppress occurrence of flicker in a through-the-lens image as a moving image of the subject which is obtained by image capturing, when the determination section determines to make the user check the effect of the aperture.

In the embodiment of the invention, the flicker is detected in the through-the-lens image as the moving image of the subject which is obtained by the image capturing. When the flicker is detected, the shutter speed, the aperture and the gain are controlled on the basis of the through-the-lens image control values as the control values for controlling the aperture, the shutter speed, and the gain so that the occurrence of flicker is preferentially suppressed in the through-the-lens image.

In the embodiment of the invention, it is determined whether or not to make the user check the effect of the aperture on the basis of the user's operation or the mode of the captured-image storage for obtaining the captured image as the still image by capturing the image of the subject. When it is determined to make the user check the effect of the aperture, the aperture, the shutter speed, and the gain are controlled on the basis of the through-the-lens image control values as the control values for controlling the aperture, the shutter speed, and the gain so that the occurrence of flicker is preferentially suppressed in the through-the-lens image as the moving image of the subject which is obtained by the image capturing.

According to the embodiments of the invention, it is possible to display the through-the-lens image before storing the captured image. In particular, it is possible to obtain the through-the-lens image closer to the image at the time of storing the captured image.

DESCRIPTION OF THE PREFERRED EMBODIMENTS

Hereinafter, modes for carrying out the invention (hereinafter referred to as embodiments) will be described. The description will be given in order of the following items.

1. First Embodiment (Imaging Apparatus)
2. Second Embodiment (Imaging Apparatus)

1. First Embodiment

Configuration of Imaging Apparatus

Figure 1:
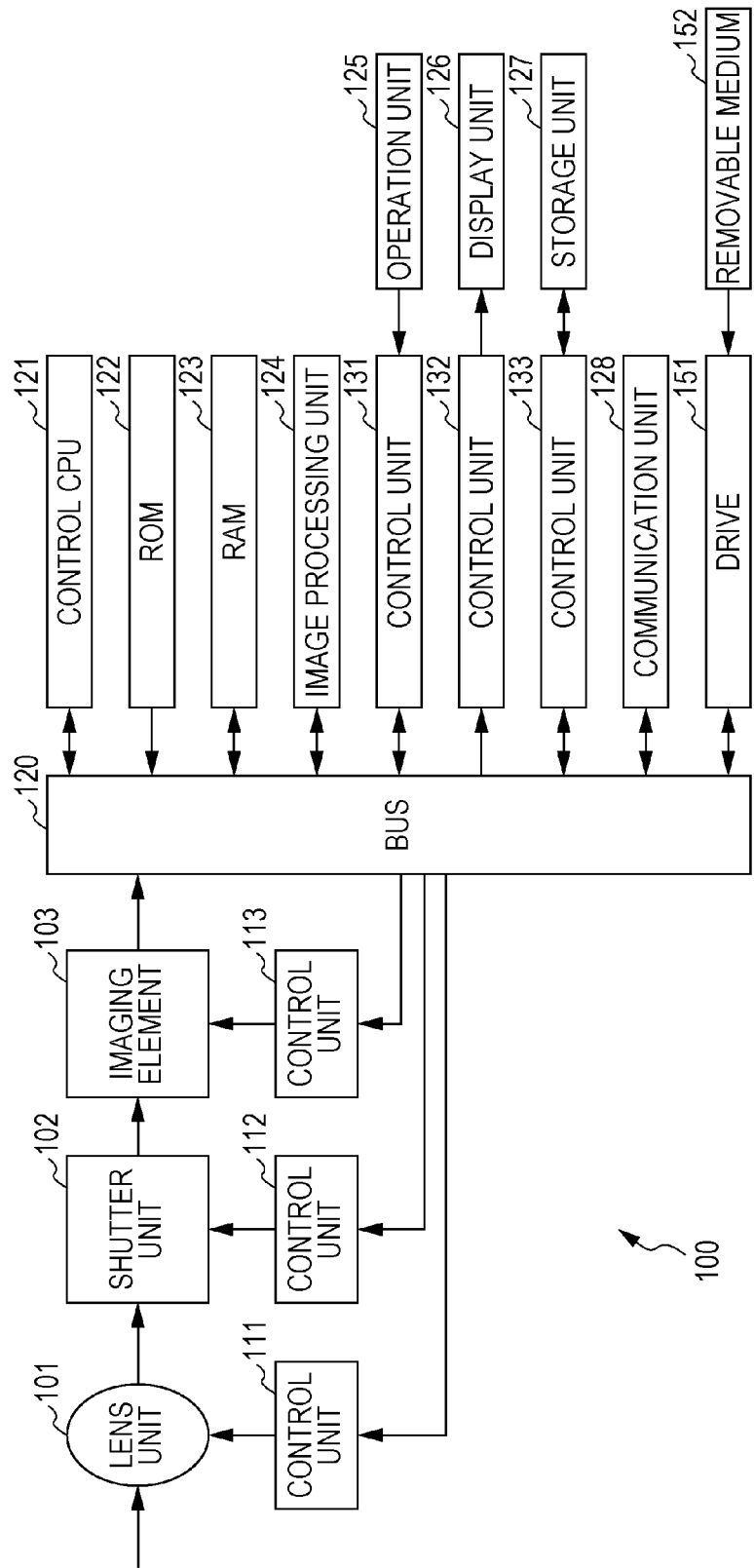
FIG. 1 is a block diagram illustrating a main configuration example of an imaging apparatus according to an embodiment of the invention.

FIG. 1 shows a configuration of an imaging apparatus according to an embodiment of the invention.

As shown in FIG. 1, an imaging apparatus 100 includes a lens unit 101, a shutter unit 102, and an imaging element 103. The lens unit 101 has optical lenses and an aperture, and is configured to adjust focal position and light amount. The shutter unit 102 has an optical (mechanical) shutter, and is configured to control exposure time. The imaging element 103 has, for example, a photoelectric element such as a CCD (Charge Coupled Device) or a CMOS (Complementary Metal Oxide Semiconductor) sensor. The imaging element 103 receives light from the subject, which is incident through the lens unit 101 and the shutter unit 102, by using the photoelectric element, and photoelectrically converts the light, thereby processing and converting an analog image signal as an electric signal corresponding to the amount of light received into a digital signal (image data). In addition, the imaging element 103 has a function of an electronic shutter for controlling a light receiving time by controlling a timing of acquiring electric charges that are optically converted and accumulated.

Further, the imaging apparatus 100 has control units 111 to 113. The control unit 111 controls the lens unit 101, the control unit 112 controls the shutter unit 102, and the control unit 113 controls the imaging element 103.

The imaging apparatus 100 has a bus 120 that connects respective processing units. The bus 120 is connected to not only the imaging element 103 and the control units 111 to 113, but also a control CPU (Central Processing Unit) 121, a ROM (Read Only Memory) 122, and a RAM (Random Access Memory) 123.

The control CPU 121 reads out, for example, programs and data stored in the ROM 122, a storage unit 127, and the like, loads and executes them in the RAM 123 and the like, and controls the respective units constituting the imaging apparatus 100, thereby executing various functions of the imaging apparatus 100.

For example, the control CPU 121 controls the control units 111 to 113 through the bus 120 and drives the lens unit 101 to the imaging element 103, thereby capturing an image of a subject while adjusting, for example, an aperture, a shutter speed (an exposure time), and an ISO sensitivity (gain). In addition, the shutter speed is an exposure time for allowing the imaging element 103 to receive light, and depends on an interval (the electronic shutter) of electric charge acquisition and an opening/closing operation of the optical shutter. That is, the shutter speed may be controlled by the optical shutter, and may be controlled by the electronic shutter. Accordingly, the shutter speed may be controlled by using either one of the optical shutter or the electronic shutter, or the shutter speed may be controlled by using both of the optical shutter and the electronic shutter.

When a user fully presses the shutter button or an instruction is issued from a self-timer or a remote controller, the imaging apparatus 100 captures an image of the subject at a predetermined timing corresponding to the full-press operation or the instruction, and acquires and stores a still image of the subject. The acquisition and storage of the still image of the subject, which are performed based on the user's operation or the instruction as described above, are referred to as captured-image storage. Further, the image (the still image) of the subject obtained by the captured-image storage is referred to as a captured image, and the timing of the captured-image storage is referred to as a captured-image storage timing.

When operating in a mode for performing the captured-image storage, the imaging apparatus 100 captures an image of the subject even at a time other than the captured-image storage timing. That is, even without the full-press operation which is performed on the shutter button by the user or the instruction which is issued from the self-timer or the remote controller, the imaging element 103 acquires (obtains) the image (the moving image) of the subject. The subject image, which is obtained other than by the captured-image storage as just described, is referred to as a through-the-lens image.

For example, on the basis of the captured-image storage mode or the user operation, it may be determined that the user wants to check the effect of the aperture, or the captured image may be stored. In this case, the control CPU 121 controls the control units 111 to 113 so as to obtain a "clear" image regardless of the occurrence of flicker. The control CPU 121 supplies the image data, which is obtained by the control, to the display unit 126 or to the storage unit 127 through the bus 120.

Further, for example, on the basis of the captured-image storage mode or the user operation, the imaging apparatus 100 itself may intend to make the user check the effect of the aperture, and flicker may not be detected in the through-the-lens image. In this case, the control CPU 121 controls the control units 111 to 113 so as to obtain the "clear" image regardless of the occurrence of flicker.

Moreover, for example, it may be determined that flicker is detected in the through-the-lens image and the imaging apparatus 100 itself intends to make the user check the effect of the aperture on the basis of the operation mode or the user operation. In this case, the control CPU 121 controls the control units 111 to 113 so as to obtain the "clear" image regardless of the occurrence of flicker. The control CPU 121 supplies the image data, which is obtained by the control, to the display unit 126, thereby displaying the image (the through-the-lens image).

The bus 120 is further connected to an image processing section 124. The image data, which is obtained in the imaging element 103, is controlled in the control CPU 121, and is supplied to the image processing section 124 through the bus 120. The image processing section 124 is controlled by the control CPU 121 so as to perform image processing, such as filter processing or flicker detection, on the image data.

The bus 120 is further connected to an operation unit 125 through a control unit 131, to a display unit 126 through a control unit 132, and to a storage unit 127 through a control unit 133.

The operation unit 125 is formed by, for example, optional input devices such as buttons and a touch panel, and receives an instruction from a user. The control unit 131 controls the operation unit 125 such that it supplies the user's instruction, which is received in the operation unit 125, to the appropriate processing units such as the control CPU 121 through the bus 120.

The display unit 126 is formed by, for example, an optional display such as an LCD (Liquid Crystal Display), a PDP (Plasma Display Panel), an organic EL display (Organic ElectroLuminescence Display), or a CRT (Cathode Ray Tube) display. The control unit 132 supplies the captured image and the image data of a GUI (Graphical User Interface) and the like, which are supplied through the bus 120, to the display unit 126, thereby displaying the image. For example, the display unit 126 is controlled by the control unit 132 so as to display the through-the-lens image.

The storage unit 127 is formed by, for example, an optional recording medium including a magnetic recording medium such as a flexible disk, a tape device, or a hard disk, a magneto optical disc such as an MD (Mini Disc: Registered Trademark of Sony Corporation), an optical disc such as a CD (Compact Disc) or a DVD (Digital Versatile Disc), a semiconductor memory such as a flash memory, an SRAM (Static Random Access Memory), or a DRAM (Dynamic Random Access Memory), or the like.

The control unit 133 supplies and stores the data and the various programs, which are supplied through the bus 120, to and in the storage unit 127. Further, the control unit 133 reads out the information stored in the storage unit 127 in response to, for example, the instruction of the control CPU 121 or the like, and supplies the information to a designated supply destination through the bus 120. For example, the storage unit 127 is controlled by the control unit 133 so as to store the image date of the captured image.

In addition, the recording medium included in the storage unit 127 may be a removable storage medium, such as a CD or a DVD, which is removable from the storage unit 127. In this case, the storage unit 127 includes a removable storage medium, a drive in which the removable storage medium is mounted, and the like. The drive is a device which is able to read and record the information from and in the mounted removable storage medium.

The bus 120 is further connected to the communication unit 128. The communication unit 128 has, for example, an optional protocol interface such as a USB (Universal Serial Bus), an IEEE (Institute of Electrical and Electronic Engineers) 1394, or an Ethernet (Registered Trademark), and communicates with an external device of the imaging apparatus 100 in accordance with the protocol, thereby interchanging the information. For example, the communication unit 128 transmits the image data, which is supplied through the bus 120, to the external device of the imaging apparatus 100, which is connected to the communication unit 128, or acquires the data and programs from the external device so as to store them in the storage unit 127 through the bus 120.

In addition, it is preferable that the communication unit 128 and the external device should be in a state of being able to communicate with each other. For example, they may be connected to each other through one or a plurality of optional networks such as a LAN or the internet.

Further, the communication unit 128 and the external device may perform wireless communication based on an optional wireless protocol such as IEEE802.11x or TransferJet (Registered Trademark). Furthermore, the communication may be performed by using both wired and wireless communication.

Moreover, the bus 120 is connected to a drive 151. The drive 151 drives a removable medium 152 such as a magnetic disk, an optical disc, a magneto optical disc, or a semiconductor memory. The drive 151 reads out the programs and the data from the mounted removable medium 152, and supplies them to an appropriate processing unit such as the control CPU 121, the RAM 123, or the storage unit 127 through the bus 120.

In addition, the drive 151 may be formed as a device different from the imaging apparatus 100. With such a configuration, when the imaging apparatus 100 reads out the information stored in the removable medium 152, the drive 151 may be appropriately connected to the imaging apparatus 100.

Configuration Example of Control CPU

Next, a configuration of the control CPU 121 will be described.

Figure 2:
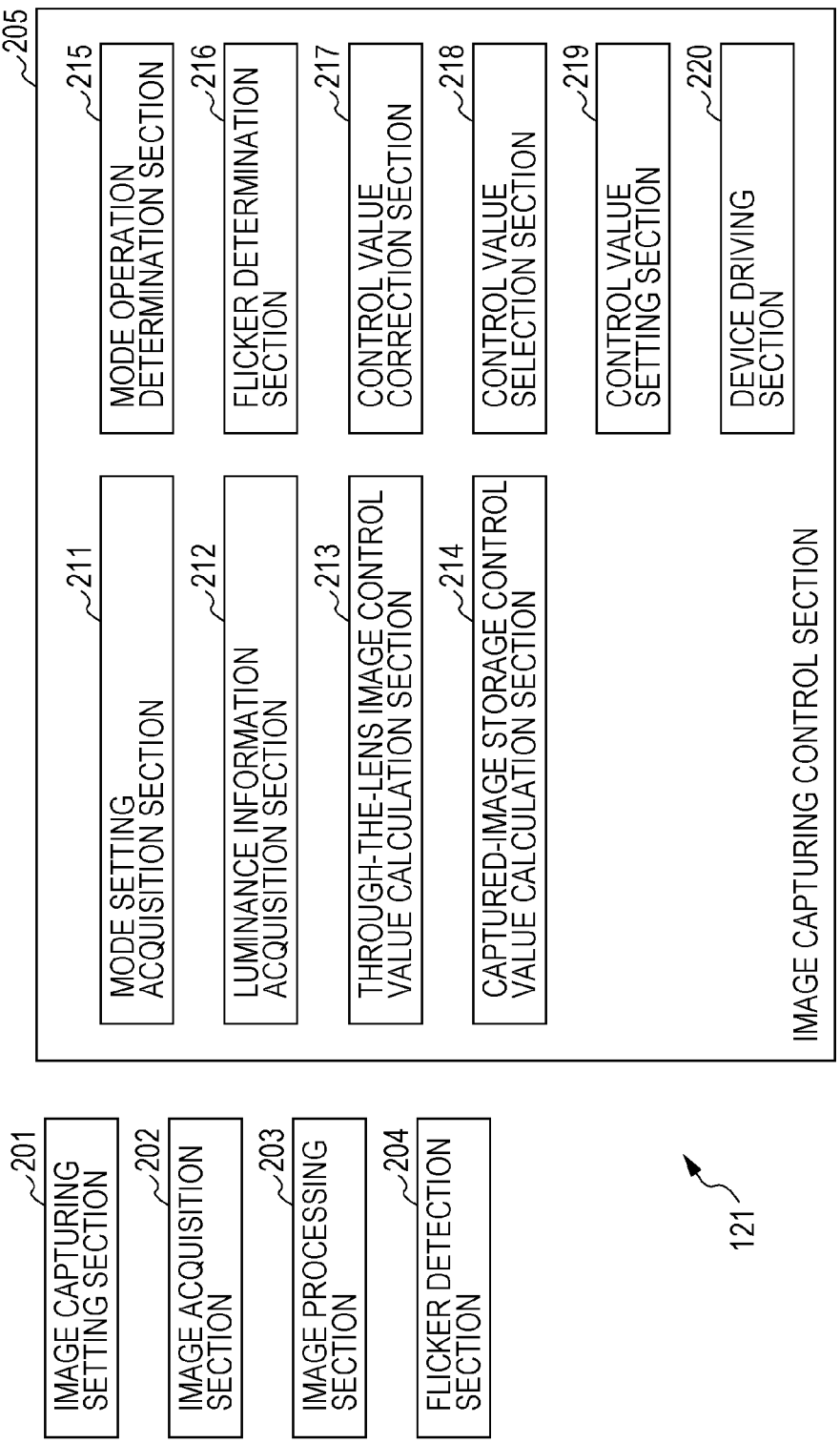
FIG. 2 is a functional block diagram illustrating a main configuration example of a control CPU of FIG. 1.

FIG. 2 is a diagram illustrating a main configuration example of functional blocks belonging to the control CPU 121 of FIG. 1. As shown in FIG. 2, the control CPU 121 has an image capturing setting section 201, an image acquisition section 202, an image processing section 203, a flicker detection section 204, and an image capturing control section 205. The control CPU 121, for example, executes a program loaded in the RAM 123 or performs processing on data, thereby implementing the respective functions described below.

The image capturing setting section 201 performs various settings of the captured-image storage mode, the aperture control value, the shutter speed, the ISO sensitivity (the gain), and the like relating to the image capturing on the basis of, for example, the user operation. The image acquisition section 202 acquires a taken image (the through-the-lens image or the captured image) by controlling the control units 111 to 113 in accordance with the setting of the image capturing setting section 201.

The image processing section 203 executes prescribed image processing on the image data by controlling the image processing section 124. The flicker detection section 204 detects the occurrence of flicker from the image data of the through-the-lens image by controlling the image processing section 124. The method of detecting flicker is optional.

The image capturing control section 205 controls image taking by setting various parameters such as the aperture control value, the shutter speed, and the ISO sensitivity (the gain) relating to the image capturing so as to further improve reproduction in the finish of the captured image in the through-the-lens image.

The image capturing control section 205 has a mode setting acquisition section 211, a luminance information acquisition section 212, a through-the-lens image control value calculation section 213, and a captured-image storage control value calculation section 214. Further, the image capturing control section 205 also has a mode operation determination section 215, a flicker determination section 216, a control value correction section 217, a control value selection section 218, a control value setting section 219, and a device driving section 220.

The mode setting acquisition section 211, for example, acquires the setting of the captured-image storage mode of the imaging apparatus 100 which is set through the image capturing setting section 201. The setting of the captured-image storage mode is retained in, for example, the RAM 123, the storage unit 127, or the like. The luminance information acquisition section 212 acquires the information on the luminance of the subject on the basis of the taken image.

The through-the-lens image control value calculation section 213 calculates a set of control values of the through-the-lens image. The set of control values is a set of control values for optional parameters including the aperture control value, the shutter speed, and the ISO sensitivity (the gain). The through-the-lens image control value calculation section 213 calculates the set of the through-the-lens image control values based on the control values which are set to preferentially suppress the occurrence of flicker in the through-the-lens image.

The captured-image storage control value calculation section 214 calculates a set of the captured-image storage control values. The captured-image storage control value calculation section 214 calculates the set of captured-image storage control values based on the control values which are set to preferentially obtain a "clear" image regardless of the occurrence of flicker.

The mode operation determination section 215 performs determination as to whether or not it is necessary to check the effect of the aperture in accordance with the various settings and the user operations. The flicker determination section 216 determines whether or not flicker occurs in the through-the-lens image.

The control value correction section 217 corrects the respective control values in the set of through-the-lens image control values which are set by the through-the-lens image control value calculation section 213. The control value selection section 218 selects the set of used control values on the basis of the determination result from the mode operation determination section 215 or the flicker determination section 216.

The control value setting section 219 sets the respective control values which are selected by the control value selection section 218, and the device driving section 220 drives the respective devices by controlling the control units 111 to 113 and the like on the basis of the set control values.

Figure 3:
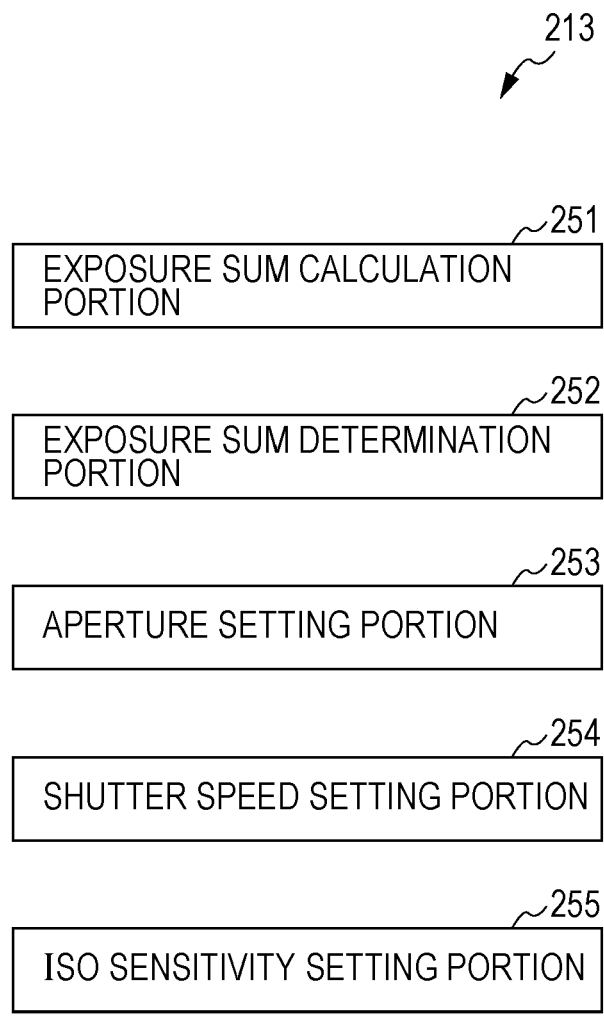
FIG. 3 is a functional block diagram illustrating a main configuration example of a through-the-lens image control value calculation section of FIG. 2.

Configuration Example of Through-the-Lens Image Control Value Calculation Section FIG. 3 is a functional block diagram illustrating a main configuration example of the through-the-lens image control value calculation section 213 of FIG. 2. As shown in FIG. 3, the through-the-lens image control value calculation section 213 has, as functional blocks, an exposure sum calculation portion 251, an exposure sum determination portion 252, an aperture setting portion 253, a shutter speed setting portion 254, and an ISO sensitivity setting portion 255. Such functional blocks are implemented, for example, by causing the control CPU 121 to execute programs loaded on the RAM 123 and process the data.

The exposure sum calculation portion 251 calculates the sum of control values necessary for correct exposure as a target on the basis of the luminance of the subject. The exposure sum determination portion 252 determines the magnitude of the sum by comparing a predetermined threshold value with the sum which is calculated by the exposure sum calculation portion 251.

The aperture setting portion 253 sets the aperture control value on the basis of the magnitude of the sum which is determined by the exposure sum determination portion 252. The shutter speed setting unit 254 sets the shutter speed on the basis of the magnitude of the sum which is determined by the exposure sum determination portion 252. The ISO sensitivity setting portion 255 sets the ISO sensitivity (the gain) on the basis of the magnitude of the sum which is determined by the exposure sum determination portion 252.

In addition, although the detailed procedure of the control value calculation method is different, the captured-image storage control value calculation section 214 sets, similarly to the through-the-lens image control value calculation section 213, the aperture control value, the shutter speed, and the ISO sensitivity (the gain) on the basis of the appropriate sum. Accordingly, the captured-image storage control value calculation section 214 has the same functional blocks as the through-the-lens image control value calculation section 213. That is, the configuration example of the functional blocks shown in FIG. 3 can be also applied to the captured-image storage control value calculation section 214. Accordingly, hereinafter, description will be given of the captured-image storage control value calculation section 214 with reference to FIG. 3.

Flow of Imaging Process

Next, the various processes executed by the imaging apparatus 100 having the above-mentioned configuration will be described. First, referring to the flowchart of FIG. 4, an example of the flow of the imaging process will be described. When power is applied to the imaging apparatus 100, the imaging process starts.

When the imaging process starts, the image capturing setting section 201 performs the settings of the captured-image storage mode and the like on the basis of, for example, the user operation, the initial setting, or the like in step S101. In step S102, the image acquisition section 202 controls the control units 111 to 113 in accordance with the setting which is made in step S101 so as to drive the lens unit 101 to the imaging element 103, thereby acquiring an image (the through-the-lens image).

The image acquisition section 202 supplies the acquired image data to the image processing section 124. The image processing section 203 performs the image processing on the image data by controlling the image processing section 124 in step S103. In step S104, the flicker detection section 204 detects flicker in the image (the through-the-lens image) of the image data by controlling the image processing section 124.

In step S105, the image capturing control section 205 takes the through-the-lens image and controls the captured-image storage while controlling the various parameters including the aperture control value, the shutter speed, and the ISO sensitivity (the gain) so as to obtain the through-the-lens image closer to the image at the time of the captured-image storage. Detailed description of the control process will be described later.

In step S106, the control CPU 121 determines whether or not to terminate the imaging process. When it is determined not to terminate the imaging process, the control CPU 121 returns the process to step S101, and repeats the process thereafter. Further, in step S106, for example, the power may be cut off to the imaging apparatus 100, or the operation mode may be changed into a viewing mode for viewing the captured images which are stored already. For these reasons, when it is determined to terminate the imaging process, the control CPU 121 terminates the imaging process.

Flow of Control Process

Next, referring to the flowchart of FIG. 5, description will be given of an example of a flow of the control process executed in step S105 of FIG. 4.

When the control process starts, the mode setting acquisition section 211 acquires various setting modes including the captured-image storage mode set by a user in step S121. Next, the luminance information acquisition section 212 acquires the luminance information, which is information on the luminance of the subject, in step S122.

In step S123, the through-the-lens image control value calculation section 213 calculates the luminance necessary for the correct exposure on the basis of the luminance information of the subject, and determines control amounts (the set of the control values) of the respective control devices corresponding to the calculated luminance. The method of calculating the set of the through-the-lens image control values will be described in detail later.

In step S124, the captured-image storage control value calculation section 214 calculates the set of captured-image storage control values on the basis of the luminance information of the subject. The method of calculating the set of the captured-image storage control values will be described in detail later.

When both sets of the through-the-lens image control values and the captured-image storage control values are calculated, a process of selecting either one thereof is performed by the mode or the like of the imaging apparatus 100. When the process of step S124 ends, the image capturing control section 205 advances the process to step S125.

In step S125, the mode operation determination section 215 determines whether or not the captured-image storage starts. For example, a user may fully press the shutter button or the event of the captured-image storage may occur because of the control signal transmitted from the self-timer or the remote controller. For these reasons, when it is determined to start the captured-image storage, the mode operation determination section 215 advances the process to step S126.

In this case, the captured-image storage is performed, and thus the control value selection section 218 selects the set of captured-image storage control values in step S126. When the process of step S126 ends, the control value selection section 218 advances the process to step S133.

Further, in step S125, when it is determined not to start the captured-image storage yet (in a state before the captured-image storage), the mode operation determination section 215 advances the process to step S127. In step S127, the mode operation determination section 215 determines whether or not a user wants to check the effect of the aperture in the through-the-lens image on the basis of the captured-image storage mode, the user operation, or the like.

Examples of the captured-image storage modes of the imaging apparatus 100 include a manual mode, an aperture priority mode, and a program shift mode. In the manual mode, a user is able to determine all of the various setting values. In the aperture priority mode, the user is able to set the aperture. Each captured-image storage mode can be selected by the user. Other control values are determined by the imaging apparatus 100 on the basis of the aperture value set by the user. In the program shift mode, the user is able to select a combination between the shutter speed and the aperture.

As described above, in the case of the mode in which the user sets the aperture, generally, it is expected that the user wants to check the effect of the aperture which is set by the user himself in the through-the-lens image. Here, it is apparent that the above-mentioned modes are just examples, and in modes other than the above-mentioned modes, the user wants to check the effect of the aperture.

Further, for example, in a certain mode, although the imaging apparatus 100 determines the aperture, the user manually sets the aperture, and then the manual setting has priority. In the case of the mode, when the user operation for the aperture setting is received, it can be assumed that the user wants to check the effect of the aperture in the through-the-lens image.

Moreover, for example, the imaging apparatus 100 may have a function, like the finder of the so-called single-lens reflex camera, capable of checking the composition of the captured image other than the through-the-lens image displayed on the display unit 126. In this case, the through-the-lens image may not be displayed. In such a case, it can be understood that displaying the through-the-lens image is an indication of the intention to check the effect of the aperture. That is, when the user operation of pressing a "preview button" for displaying the through-the-lens image is received, it can be assumed that the user wants to check the effect of the aperture in the through-the-lens image.

As described above, the prescribed operations can be treated as the user's intention to check the effect of the aperture. It is apparent that operations other than the above-mentioned operations may be treated as the user's intention to check the effect of the aperture.

In step S127, it may be determined on the basis of the captured-image storage mode or the user operation in such a manner that the user wants to check the effect of the aperture in the through-the-lens image. In this case, the mode operation determination section 215 advances the process to step S128.

In this case, the through-the-lens image is obtained on the basis of the control values which are as similar as possible to the control values at the time of the captured-image storage. Accordingly, in step S128, the control value correction section 217 corrects the respective through-the-lens image control values calculated in step S123 on the basis of the respective captured-image storage control values for the captured-image storage so as to make the respective through-the-lens image control values close to the respective captured-image storage control values. The flow of the process of correcting the control values will be described in detail later.

When the control values are corrected, in step S129, the control value selection section 218 selects the set of the control values (after the correction) corrected by the process of step S128. When the set of corrected control values is selected, the control value selection section 218 advances the process to step S133.

In this case, the set of captured-image storage control values calculated in the process of step S124 may be selected. However, generally, the set of captured-image storage control values does not limit control values appropriate for the through-the-lens image. For example, in the case of the captured-image storage or the like of which exposure time is long, the shutter speed is low, and the frame rate of the through-the-lens image decreases. Hence, there is a concern that a frame advance image or a still image which is unnatural is obtained.

Further, when the aperture is set and the exposure amount is appropriate, the setting difference in the shutter speed or the ISO sensitivity (the gain) is not remarkable contrary to the aperture value. Moreover, it is conceivable that the subject is under a condition where flicker occurs. Accordingly, although it is a top priority to make a user check the effect of the aperture, it is also preferable to suppress an occurrence of flicker as much as possible.

Accordingly, the image capturing control section 205 (control value correction section 217) corrects the set of the through-the-lens image control values as described above, thereby making the respective control values close to the set of the captured-image storage control values within an appropriate range of the control values of the through-the-lens image.

However, in step S127, on the basis of the captured-image storage mode, the user operation, or the like, it may be determined that the user does not want to check the effect of the aperture in the through-the-lens image. In this case, the mode operation determination section 215 advances the process to step S130.

In step S130, the mode operation determination section 215 determines whether or not the imaging apparatus 100 intends to make the user check the effect of the aperture in the through-the-lens image, on the basis of the captured-image storage mode, the user operation, or the like.

As the captured-image storage mode of the imaging apparatus 100, for example, there is an automatic scene recognition mode.

The automatic scene recognition mode is a mode for allowing the imaging apparatus 100 to select the captured-image storage mode in accordance with the subject. In the case of the automatic scene recognition mode, the imaging apparatus 100 selects, in accordance with the characteristics of the taken image, a mode most appropriate for the subject among the modes of, for example, night view, night view and person, tripod night view, backlight, backlight and person, landscape, macro, person (portrait), and the like. The number or the kinds of the selectable modes or the selection methods are optional. The imaging apparatus 100 sets, in accordance with the selected mode, the set of control values such as the aperture, the shutter speed, and the ISO sensitivity (the gain).

In the case of the automatic scene recognition mode, the user does not set the aperture. However, for example, like the mode of person (portrait), night view and person, and the like, in the case of the mode in which the main subject is set to be a person, the imaging apparatus 100 makes a setting so as to blur the background on purpose to emphasize the subject (the person).

In the case of such a mode, the depth of field is important, and thus it is preferable to make a user check the effect of the aperture. That is, it can be assumed that the imaging apparatus 100 intends to make the user check the effect of the aperture. As might be expected, if a mode focuses on the depth of field, although the mode is one other than the above-mentioned modes, it can be assumed that the imaging apparatus 100 intends to make the user check the effect of the aperture.

The mode operation determination section 215 determines that the imaging apparatus 100 intends to make the user check the effect of the aperture in the through-the-lens image, in accordance with the above-mentioned mode in step S130, and then advances the process to step S131.

In order to make the user to check the effect of the aperture, it is necessary to adjust at least the aperture control value to the captured-image storage control value. However, when the subject is under the condition where the flicker occurs, the flicker occurs in the through-the-lens image. Hence, there is a concern that the finish of the image may become different from the captured image.

For this reason, the flicker determination section 216 determines whether or not the flicker is detected in the through-the-lens image, on the basis of the flicker detection result performed by the flicker detection section 204 in step S131.

When the flicker is not detected and it is determined that the subject is not under a flicker condition, the flicker determination section 216 returns the process to step S128. That is, when the flicker is not detected in the through-the-lens image, the image capturing control section 205 (the control value correction section 217) corrects the set of through-the-lens image control values similarly to the case where the user wants to check the effect of the aperture.

Further, in step S131, when the flicker detection section 204 determines that the flicker is detected in the through-the-lens image, the flicker determination section 216 advances the process to step S132. That is, in this case, since the flicker apparently occurs in the through-the-lens image, it is difficult for the user to check the effect of the aperture. Moreover, it is difficult to say that the user does not set the aperture and focuses on the effect of the aperture. For this reason, in the image capturing control section 205, it is a top priority to make the finish of the through-the-lens image close to the captured image by suppressing the occurrence of flicker in the through-the-lens image.

Further, in step S130, it may be determined that the imaging apparatus 100 does not intend to make the user check the effect of the aperture. In this case, the mode operation determination section 215 advances the process to step S132.

For example, when the mode which does not focus on the depth of field is selected by the automatic scene recognition mode, it can be assumed that the imaging apparatus 100 does not intend to make the user check the effect of the aperture.

Further, examples of other captured-image storage modes of the imaging apparatus 100 include a scene selection mode and a shutter speed priority mode.

The scene selection mode is a mode for allowing a user to set a shot (a scene) at the time of the captured-image storage. The respective scenes have respective sets of control values most appropriate for the respective scene. That is, when the user sets the scene at the time of the captured-image storage, the imaging apparatus 100 sets the respective control values such as the aperture control value, the shutter speed (the exposure time), and the ISO sensitivity (the gain) to values corresponding to the set scene.

The shutter speed priority mode is a mode for allowing a user to set the shutter speed (the exposure time) and allowing the image capturing setting section 201 to set other control values such as the aperture control value and the ISO sensitivity (the gain) on the basis of the set values.

In the case of the mode for allowing the imaging apparatus 100 to perform the entire aperture setting like the above-mentioned modes, it can be assumed that the user does not want to check the effect of the aperture and the imaging apparatus 100 also does not intend to make the user check the effect of the aperture.

For this reason, in the case of such a mode, the control value selection section 218 selects the set of through-the-lens image control values in step S132. When the set of control values is selected, the control value selection section 218 advances the process to step S133.

In step S133, the control value setting section 219 sets the respective control values of the set of control values selected in step S126, step S129, or step S132. In step S134, the device driving section 220 drives the devices such as the lens unit 101 to the imaging element 103 in accordance with the control values which are set through the process of step S133.

Figure 4:
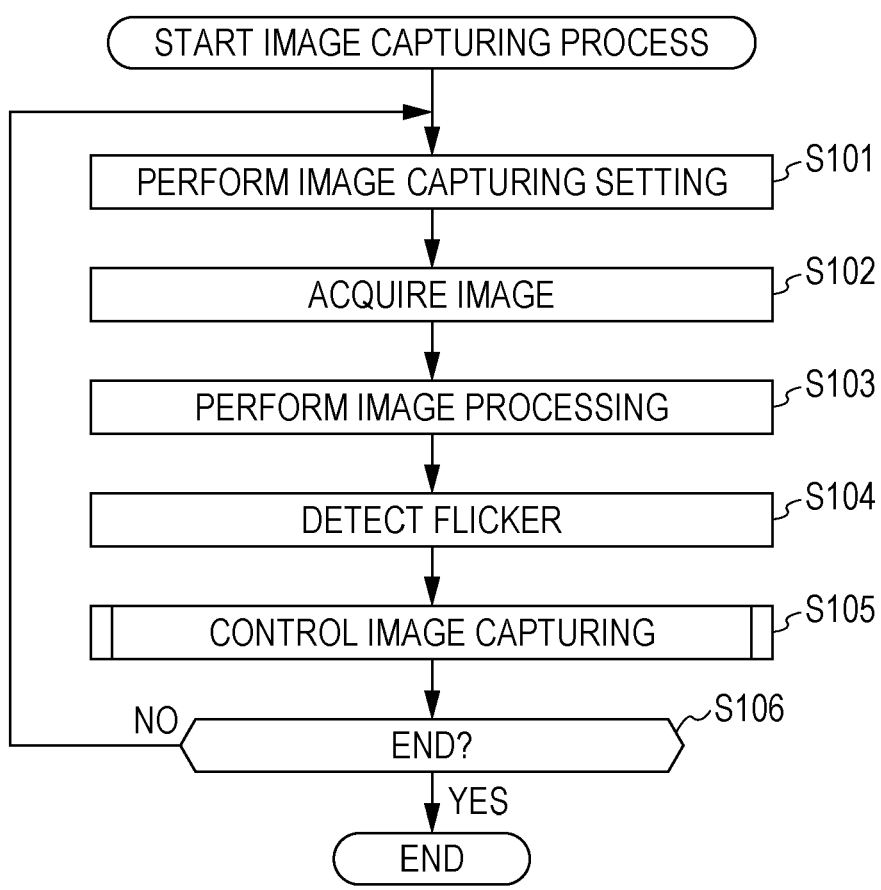
FIG. 4 is a flowchart illustrating a flow of an imaging process.

When the process of step S134 is terminated, the image capturing control section 205 returns the process to step S105 of FIG. 4, and advances the process to step S106.

Figure 5:
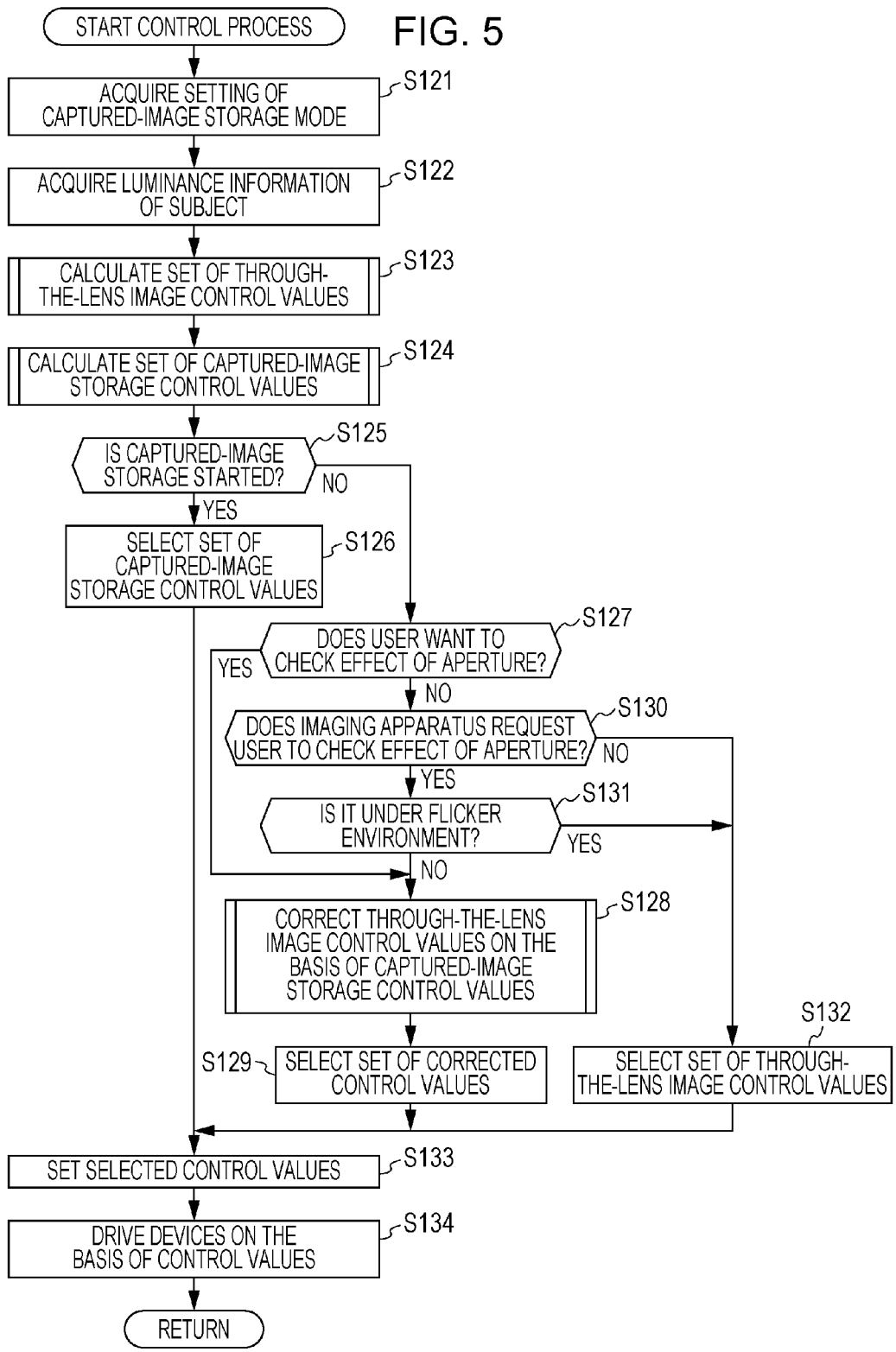
FIG. 5 is a flowchart illustrating an example of a flow of a control process.

That is, during the imaging process of FIG. 4, the control process of FIG. 5 is repeatedly performed.

As described above, only if the flicker determination section 216 determines that the subject is under the flicker condition, the control value selection section 218 selects the set of through-the-lens image control values as control values at the time of taking the through-the-lens image. Thereby, at the time of the captured-image storage, it is possible to use the set of captured-image storage control values regardless of an occurrence of flicker. Consequently, it is possible to prevent the control parameter values at the time of the captured-image storage from being restricted due to the control before the captured-image storage.

Additionally, even when flicker occurs, the imaging apparatus 100 is able to reduce the difference in finish between the through-the-lens image and the captured image. For example, when flicker occurs in the through-the-lens image, the finish of the image becomes different from the captured image in which flicker does not occur. However, as described above, when flicker is detected, the imaging apparatus 100 selects the set of through-the-lens image control values. Therefore, it is possible to suppress occurrence of flicker in the through-the-lens image.

Here, the important thing is that, only if the control value selection section 218 determines that "the subject is under a flicker condition", the set of the through-the-lens image control values is selected. In other words, when flicker does not occur, the control value selection section 218 does not select the set of through-the-lens image control values as it is, and selects the values which are corrected so that the set of through-the-lens image control values is close to the set of captured-image storage control values.

When the set of through-the-lens image control values is used, the occurrence of flicker is suppressed. However, the set of through-the-lens image control values is highly likely to be different from the set of captured-image storage control values. That is, although not as bad as the occurrence of flicker, there is a concern about an occurrence of a difference in finish between the through-the-lens image and the captured image.

For example, in the case of the method disclosed in Japanese Unexamined Patent Application Publication No. 2006-74530, in a state where the shutter is not pressed, by inevitably using an exposure diagram for the through-the-lens image different from an exposure diagram for the captured-image storage, the aperture control value, the shutter speed value, and the like are calculated. Consequently, it is difficult for the user to accurately check the finish of the captured image until pressing the shutter halfway.

Further, in the case of the method disclosed in Japanese Unexamined Patent Application Publication No. 2006-74530, for example, when the user manually adjusts the aperture, in order to check the effect of the aperture in the captured image, it is necessary for the user to press the shutter button halfway at the time of changing the aperture control value. Further, in certain captured-image storages such as the captured-image storage using the self-timer, the automatic captured-image storage performed by detecting a smile of the subject, or the captured-image storage using the remote controller, the so-called "half-press" operation performed on the shutter button may be omitted. In the case of the captured-image storage, it is necessary for the user to perform the captured-image storage in a state of being unable to check the finish of the captured image.

In contrast, in the imaging apparatus 100, "only if it is determined that the subject is under the flicker condition", the control value selection section 218 selects the set of through-the-lens image control values. Therefore, it is possible to further reduce the difference between the through-the-lens image control values and the captured-image storage control values.

That is, regardless of presence or absence of the occurrence of flicker, the imaging apparatus 100 is able to obtain the through-the-lens image closer to the image at the time of the captured-image storage. Thus, it is not necessary for the user to perform a particular operation, and the user is able to more accurately check the finish of the captured image by using the through-the-lens image.

In addition, when it is determined that the subject is not under the flicker condition, as described above, the control value selection section 218 may select the set of the captured-image storage control values.

Further, the control value selection section 218 selects the values which are corrected so as to be close to the set of the captured-image storage control values, regardless of presence or absence of the occurrence of flicker, when it is determined that the user wants to check the effect of the aperture on the basis of the captured-image storage mode, the user operation, or the like.

In contrast, the control value selection section 218 selects the set of through-the-lens image control values, regardless of a presence or absence of the occurrence of flicker, when it is determined that the user does not want to check the effect of the aperture and the imaging apparatus 100 itself also does not intend to make the user check the effect of the aperture, on the basis of the captured-image storage mode, the user operation, or the like.

As described above, it may be apparent whether or not to focus on the checking of the effect of the aperture. In this case, the imaging apparatus 100 is able to obtain the more stabilized through-the-lens image by determining the set of control values selected regardless of a presence or absence of the occurrence of flicker so as to suppress unnecessary update of the control values.

Further, as described above, it is determined whether or not the imaging apparatus 100 intends to make the user check the effect of the aperture, on the basis of the captured-image storage mode, the user operation, or the like. Accordingly, when it is necessary for the user to check the effect of the aperture, the user is able to view the through-the-lens image in which priority is given to checking the effect of the aperture, without having to perform a particular operation. Moreover, when it is not necessary to check the effect of the aperture, the user is able to view the through-the-lens image in which priority is given to suppressing the occurrence of flicker, without having to perform a particular operation.

Consequently, the user is able to view the through-the-lens image which is suitable for the situation.

Flow of Process of Calculating Set of Through-the-Lens Image Control Values

Next, referring to the flowchart of FIG. 6, description will be given of an example of the flow of the process of calculating the set of through-the-lens image control values which is executed in step S123 of FIG. 5.

Hereinafter, the description will be given under assumption that the frequency of the ambient light source is 60 Hz which is also used as a frequency of a commercial power supply. It is apparent that the frequency may be 50 Hz or may be a frequency other than that.

Basically, in order to suppress the occurrence of flicker in the through-the-lens image, it is effective to make the shutter speed equal to an integer multiple of the frequency of the light source. Hereinafter, the shutter speed equal to the integer multiple of the frequency of the light source is referred to as a flickerless shutter speed. That is, in the case of the light source frequency of 60 Hz, the flickerless shutter speed is represented as the following set.

$$\text{flickerless shutter speed} = \{n/120 \mid n \in N\}$$

$$= \{1/120, 1/60, 1/30, \ldots\}$$

When the process of calculating the set of through-the-lens image control values starts, the exposure sum calculation portion 251 (FIG. 3) of the through-the-lens image control value calculation section 213 calculates, in step S151, the sum (the target exposure sum) of the target exposure values, that is, the exposure values necessary for the correct exposure of the subject, on the basis of the level of the luminance of the subject acquired in the process of step S122 of FIG. 5.

When the target exposure sum is calculated, the respective control values are determined on the basis of the magnitude thereof. For example, the process is performed in the following procedure.

In step S152, the exposure sum determination portion 252 determines whether or not the target exposure sum is lower than the lower limit of the controllable range of the imaging apparatus 100. That is, the exposure sum determination portion 252 compares the target exposure sum, which is calculated in step S151, with a sum (a reference exposure value) of the lower limit of the aperture control value, the lower limit of the shutter speed (the lowest shutter speed, that is, the upper limit of the exposure time), and the upper limit of the ISO sensitivity (the gain) (the highest sensitivity) which can be controlled by the imaging apparatus 100.

It may be determined that the target exposure sum is smaller than the reference exposure value in this case and is less than the lower limit of the controllable range of the imaging apparatus 100. In this case, the exposure sum determination portion 252 advances the process to step S153.

In this case, since the target exposure sum is out of the allowable range, the setting is made so that all the exposure parameters reach the limit value. That is, the aperture setting portion 253 sets the aperture control value to the lower limit in step S153. The shutter speed setting unit 254 sets the shutter speed to the lower limit (the upper limit of the exposure time) in step S154. The ISO sensitivity setting portion 255 sets the ISO sensitivity (the gain) to the upper limit (the highest sensitivity) in step S155.

When the respective control values are set, the through-the-lens image control value calculation section 213 terminates the process of calculating the set of through-the-lens image control values, returns the process to step S123 of FIG. 5, and advances the process to step S124.

Figure 6:
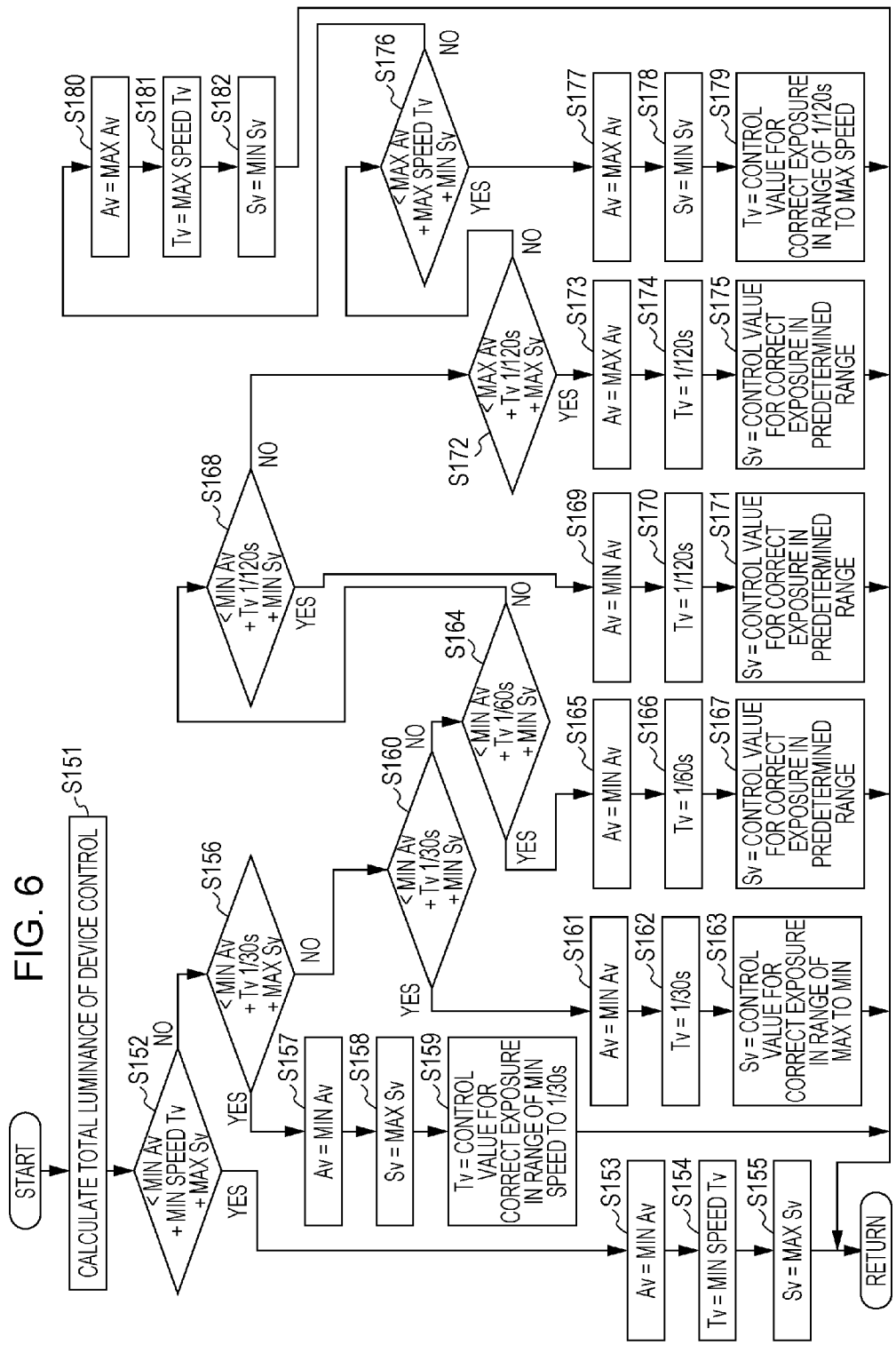
FIG. 6 is a flowchart illustrating an example of a flow of a process of calculating a set of through-the-lens image control values.

Further, in step S152 of FIG. 6, it may be determined that the target exposure sum is equal to or more than the reference exposure value in this case and is not less than the controllable lower limit of the imaging apparatus 100. In this case, the exposure sum determination portion 252 advances the process to step S156.

Thereafter, the exposure sum determination portion 252 repeatedly compares the reference exposure value with the target exposure sum while gradually increasing the reference exposure value until the target exposure sum is less than the reference exposure value. That is, the exposure sum determination portion 252 discriminates the magnitude of the target exposure sum. The aperture setting portion 253 to the ISO sensitivity setting portion 255 sets the control value in accordance with the discriminated magnitude of the target exposure sum.

Hereinafter, detailed description will be given. In step S156, the exposure sum determination portion 252 determines whether or not the target exposure sum is less than the lower limit of the aperture control value, the lowest flickerless shutter speed, and the lower limit of the ISO sensitivity (the gain). That is, the exposure sum determination portion 252 compares the target exposure sum, which is calculated in step S151, with the sum (the reference exposure value) of the lower limit of the aperture control value, the lowest flickerless shutter speed (1/30 seconds), and the upper limit of the ISO sensitivity (the gain) (the highest sensitivity) in a settable range of the imaging apparatus 100.

When it is determined that the target exposure sum is smaller than the reference exposure value in this case, the exposure sum determination portion 252 advances the process to step S157. In this case, the aperture setting portion 253 sets the aperture control value to the lower limit in step S157. The ISO sensitivity setting portion 255 sets the ISO sensitivity control value (the gain) to the upper limit (the highest sensitivity) in step S158.

Further, the shutter speed setting portion 254 sets the shutter speed to the value to achieve the correct exposure within the range of the lower limit (the upper limit of the exposure time, that is, the lowest value) to 1/30 seconds in step S159. That is, the shutter speed setting portion 254 sets the shutter speed to the value obtained by subtracting the aperture control value and the ISO sensitivity control value (the gain), which are set then, from the target exposure sum.

When the respective control values are set, the through-the-lens image control value calculation section 213 terminates the process of calculating the set of through-the-lens image control values, returns the process to step S123 of FIG. 5, and advances the process to step S124.

Further, in step S156 of FIG. 6, when it is determined that the target exposure sum is equal to or more than the reference exposure value in this case, the exposure sum determination portion 252 advances the process to step S160.

In step S160, the exposure sum determination portion 252 determines whether or not the target exposure sum is less than the sum of the lower limit of the aperture control value, the lowest flickerless shutter speed, and the upper limit of the ISO sensitivity (the gain). That is, the exposure sum determination portion 252 compares the target exposure sum, which is calculated in step S151, with the sum (the reference exposure value) of the lower limit of the aperture control value, the lowest flickerless shutter speed (1/30 seconds), and the lower limit of the ISO sensitivity (the gain) (the lowest sensitivity) which can be set by the imaging apparatus 100.

When it is determined that the target exposure sum is smaller than the reference exposure value in this case, the exposure sum determination portion 252 advances the process to step S161. In this case, the aperture setting portion 253 sets the aperture control value to the lower limit in step S161. The shutter speed setting unit 254 sets the shutter speed to the lowest flickerless shutter speed (1/30 seconds) in step S162.

Further, the ISO sensitivity setting portion 255 sets the ISO sensitivity (the gain) to the value to achieve the correct exposure within the range of the upper limit (the highest sensitivity) to the lower limit (the lowest sensitivity) in step S163. That is, the ISO sensitivity setting portion 255 sets the ISO sensitivity to the value obtained by subtracting the aperture control value and the shutter speed, which are set then, from the target exposure sum.

When the respective control values are set, the through-the-lens image control value calculation section 213 terminates the process of calculating the set of through-the-lens image control values, returns the process to step S123 of FIG. 5, and advances the process to step S124.

Further, in step S160 of FIG. 6, when it is determined that the target exposure sum is equal to or more than the reference exposure value in this case, the exposure sum determination portion 252 advances the process to step S164.

In step S164, the exposure sum determination portion 252 determines whether or not the target exposure sum is less than the sum of the lower limit of the aperture control value, the second lowest flickerless shutter speed, and the lower limit of the ISO sensitivity (the gain). That is, the exposure sum determination portion 252 compares the target exposure sum, which is calculated in step S151, with the sum (the reference exposure value) of the lower limit of the aperture control value, the second lowest flickerless shutter speed (1/60 seconds), and the lower limit of the ISO sensitivity (the gain) (the lowest sensitivity) which can be set by the imaging apparatus 100.

When it is determined that the target exposure sum is smaller than the reference exposure value in this case, the exposure sum determination portion 252 advances the process to step S165. In this case, the aperture setting portion 253 sets the aperture control value to the lower limit in step S165. The shutter speed setting unit 254 sets the shutter speed to the second lowest flickerless shutter speed (1/60 seconds) in step S166.

Moreover, the ISO sensitivity setting portion 255 sets the ISO sensitivity (the gain) to the value to achieve the correct exposure in a predetermined range in step S167. That is, the ISO sensitivity setting portion 255 sets the ISO sensitivity to the value obtained by subtracting the aperture control value and the shutter speed, which are set then, from the target exposure sum. It should be noted that the upper limit of the predetermined range is the upper limit of the ISO sensitivity (the gain) (the highest sensitivity). Further, the lower limit of the predetermined range is a value which is lower by an amount of the luminance of the second lowest flickerless shutter speed than the upper limit thereof.

When the respective control values are set, the through-the-lens image control value calculation section 213 terminates the process of calculating the set of through-the-lens image control values, returns the process to step S123 of FIG. 5, and advances the process to step S124.

Further, in step S164 of FIG. 6, when it is determined that the target exposure sum is equal to or more than the reference exposure value in this case, the exposure sum determination portion 252 advances the process to step S168.

In step S168, the exposure sum determination portion 252 determines whether or not the target exposure sum is less than the sum of the lower limit of the aperture control value, the third lowest flickerless shutter speed, and the lower limit of the ISO sensitivity (the gain). That is, the exposure sum determination portion 252 compares the target exposure sum, which is calculated in step S151, with the sum (the reference exposure value) of the lower limit of the aperture control value, the third lowest flickerless shutter speed ($1/120$ seconds), and the lower limit of the ISO sensitivity (the gain) (the lowest sensitivity) which can be set by the imaging apparatus 100.

When it is determined that the target exposure sum is smaller than the reference exposure value in this case, the exposure sum determination portion 252 advances the process to step S169. In this case, the aperture setting portion 253 sets the aperture control value to the lower limit in step S169. The shutter speed setting unit 254 sets the shutter speed to the third lowest flickerless shutter speed ($1/120$ seconds) in step S170.

Further, the ISO sensitivity setting portion 255 sets the ISO sensitivity (the gain) to the value to achieve the correct exposure in a predetermined range in step S171. That is, the ISO sensitivity setting portion 255 sets the ISO sensitivity to the value obtained by subtracting the aperture control value and the shutter speed control value, which are set then, from the target exposure sum.

When the respective control values are set, the through-the-lens image control value calculation section 213 terminates the process of calculating the set of through-the-lens image control values, returns the process to step S123 of FIG. 5, and advances the process to step S124.

The through-the-lens image control value calculation section 213 repeats the above-mentioned procedure by the number of the elements of the flickerless shutter speed. That is, each flickerless shutter speed is compared with the target exposure sum and the reference exposure value. Here, since the frequency of the light source is 60 Hz, the maximum speed of the flickerless shutter speed (the shortest exposure time during which flicker does not occur) is $1/120$ seconds.

Accordingly, in step S168 of FIG. 6, when it is determined that the target exposure sum is equal to or more than the reference exposure value in this case, the exposure sum determination portion 252 advances the process to step S172.

In step S172, the exposure sum determination portion 252 determines whether or not the target exposure sum is less than the sum of the upper limit of the aperture control value, the third lowest (the maximum speed) flickerless shutter speed, and the upper limit of the ISO sensitivity (the gain). That is, the exposure sum determination portion 252 compares the target exposure sum, which is calculated in step S151, with the sum (the reference exposure value) of the lower limit of the aperture control value, the maximum flickerless shutter speed ($1/120$ seconds), and the upper limit of the ISO sensitivity (the gain) (the highest sensitivity) which can be set by the imaging apparatus 100.

When it is determined that the target exposure sum is smaller than the reference exposure value in this case, the exposure sum determination portion 252 advances the process to step S173. In this case, the aperture setting portion 253 sets the aperture control value to the maximum value in step S173. The shutter speed setting unit 254 sets the shutter speed control value to the maximum flickerless shutter speed ($1/120$ seconds) in step S174.

Moreover, the ISO sensitivity setting portion 255 sets the ISO sensitivity (the gain) to the value to achieve the correct exposure within a predetermined range in step S175. That is, the ISO sensitivity setting portion 255 sets the ISO sensitivity to the value obtained by subtracting the aperture control value and the shutter speed control value, which are set then, from the target exposure sum. It should be noted that the upper limit of the predetermined range is the upper limit of the ISO sensitivity (the gain) (the highest sensitivity). Further, the lower limit of the predetermined range is a value which is lower by an amount of the luminance of the maximum flickerless shutter speed than the upper limit thereof.

When the respective control values are set, the through-the-lens image control value calculation section 213 terminates the process of calculating the set of through-the-lens image control values, returns the process to step S123 of FIG. 5, and advances the process to step S124.

Further, in step S168 of FIG. 6, when it is determined that the target exposure sum is equal to or more than the reference exposure value in this case, the exposure sum determination portion 252 advances the process to step S176.

In step S176, the exposure sum determination portion 252 determines whether or not the target exposure sum is less than the sum of the upper limit of the aperture control value, the upper limit of the shutter speed (the lower limit of the exposure time), and the lower limit of the gain. That is, the exposure sum determination portion 252 compares the target exposure sum, which is calculated in step S151, with the sum (the reference exposure value) of the upper limit of the aperture control value, the upper limit (the maximum speed) of the shutter speed, and the lower limit of the ISO sensitivity (the gain) (the lowest sensitivity) which can be set by the imaging apparatus 100.

When it is determined that the target exposure sum is smaller than the reference exposure value in this case, the exposure sum determination portion 252 advances the process to step S177. In this case, the aperture setting portion 253 sets the aperture control value to the upper limit in step S177. The ISO sensitivity setting portion 255 sets the ISO sensitivity (the gain) to the lower limit in step S178.

Further, the shutter speed setting portion 254 sets the shutter speed to the value to achieve the correct exposure within the range of $1/120$ seconds to the upper limit (the maximum speed) in step S179. That is, the shutter speed setting portion 254 sets the shutter speed to the value obtained by subtracting the aperture control value and the ISO sensitivity (the gain), which are set then, from the target exposure sum.

When the respective control values are set, the through-the-lens image control value calculation section 213 terminates the process of calculating the set of through-the-lens image control values, returns the process to step S123 of FIG. 5, and advances the process to step S124.

Further, in step S176 of FIG. 6, when it is determined that the target exposure sum is more than the upper limit of the controllable range of the imaging apparatus 100, the exposure sum determination portion 252 advances the process to step S180.

In this case, the target exposure sum is out of the allowable range. The aperture setting portion 253 sets the aperture control value to the upper limit in step S180. The shutter speed setting unit 254 sets the shutter speed to the upper limit (the maximum speed) in step S181. The ISO sensitivity setting portion 255 sets the ISO sensitivity (the gain) to the lower limit (the lowest sensitivity) in step S182.

When the respective control values are set, the through-the-lens image control value calculation section 213 terminates the process of calculating the set of through-the-lens image control values, returns the process to step S123 of FIG. 5, and advances the process to step S124.

The through-the-lens image control value calculation section 213 is able to calculate the control values necessary to suppress the occurrence of flicker by requesting the respective control values of the through-the-lens image control value set in the above-mentioned procedure.

That is, here, the important thing is that the shutter speed setting portion 254 sets the shutter speed to any one of the flickerless shutter speeds, as far as possible, in order to suppress the occurrence of flicker.

In other words, as far as the shutter speed is set to any one of the flickerless shutter speeds, the respective control values may be requested in a procedure other than the above-mentioned procedure. That is, the respective determination processes of step S152, step S156, step S160, step S164, step S168, step S172, and step S176 may be performed in an optional procedure. For example, in the flow of FIG. 6, the process may advance from step S176 to step S152.

Further, the contents of the respective determination processes may be modified from the above description referring to FIG. 6. The above-mentioned procedure focuses on only using the flickerless shutter speed, and thus other parameters are not considered in the procedure. However, for example, the gain or the depth of field at the time of the captured-image storage may be intended to be reflected in the through-the-lens image as much as possible, there may be a restriction on the image taking, or there may be a restriction on the device control. In such a case, it may be necessary to consider something other than suppression of the occurrence of flicker.

In order to cope with the respective cases, the control procedure shown in FIG. 6 may be changed. For example, in the above description of FIG. 6, fine adjustment in exposure is performed on the respective flickerless shutter speeds on the basis of the ISO sensitivity (the gain) (for example, step S163, step S167, and step S171), and the aperture value is set to be as small as possible (for example, step S161, step S165, and step S169). However, the embodiment of the invention is not limited to this, and the aperture control value may be preferentially maximized.

That is, when the shutter speed is set to be maintained at the flickerless shutter speed, since the other control methods are basically optional, the image capturing control section 205 is able to calculate the through-the-lens image control values appropriate for more various conditions.

Flow of Process of Calculating Set of Captured-Image Storage Control Values

Next, referring to the flowchart of FIG. 7, description will be given of an example of the flow of the process of calculating the set of the captured-image storage control values, which is performed in step S124 of FIG. 5.

Hereinafter, it is assumed that the focal length of the lens is 40 mm. Generally, when the shutter speed (the exposure time) is less than "1/focal length", the blurring of the captured image caused by hand shaking is suppressed. Hereinafter, in the following description, a turning point for hand-shake suppression is at $1/40$ seconds. This turning point ($1/40$ seconds) is referred to as a hand-shake shutter speed. That is, when the shutter speed (the exposure time) is less than $1/40$ seconds, it is assumed that "blurring" caused by hand shaking in the captured image is suppressed. It should be noted that, when various hand-shake correction functions including an optical hand-shake correction function separately execute processes of reducing hand shaking, there is no restriction as mentioned above.

When the process of calculating the set of captured-image storage control values starts, the exposure sum calculation portion 251 (FIG. 3) of the captured-image storage control value calculation section 214 calculates, in step S201, the sum (the target exposure sum) of the target exposure values, that is, the exposure values necessary for the correct exposure of the subject, on the basis of the level of the luminance of the subject acquired in the process of step S122 of FIG. 5. The value is a common parameter of the luminance absorbing the differences of devices, the parameter including the exposure amount (EV), and it is possible to control exposure to make it appropriate by dividing the value among the devices contributing to control exposure.

When the target exposure sum is calculated, the respective control values are determined on the basis of the magnitude thereof. For example, the process is performed in the following procedure.

In step S202, the exposure sum determination portion 252 determines whether or not the target exposure sum is lower than the lower limit of the controllable range of the imaging apparatus 100. That is, the exposure sum determination portion 252 compares the target exposure sum, which is calculated in step S201, with the sum (the reference exposure value) of the lower limit of the aperture control value, the lower limit of the shutter speed (the lowest shutter speed, that is, the upper limit of the exposure time), and the upper limit of the ISO sensitivity (the gain) (the highest sensitivity) which can be set by the imaging apparatus 100.

It may be determined that the target exposure sum is smaller than the reference exposure value in this case and is less than the lower limit of the controllable range of the imaging apparatus 100. In this case, the exposure sum determination portion 252 advances the process to step S203.

In this case, since the target exposure sum is out of the allowable range, the setting is made so that all the exposure parameters reach the limit value. That is, the aperture setting portion 253 sets the aperture control value to the lower limit in step S203. The shutter speed setting unit 254 sets the shutter speed to the lower limit (the upper limit of the exposure time) in step S204. The ISO sensitivity setting portion 255 sets the ISO sensitivity (the gain) to the upper limit (the highest sensitivity) in step S205.

When the respective control values are set, the captured-image storage control value calculation section 214 terminates the process of calculating the set of captured-image storage control values, returns the process to step S124 of FIG. 5, and advances the process to step S125.

Figure 7:
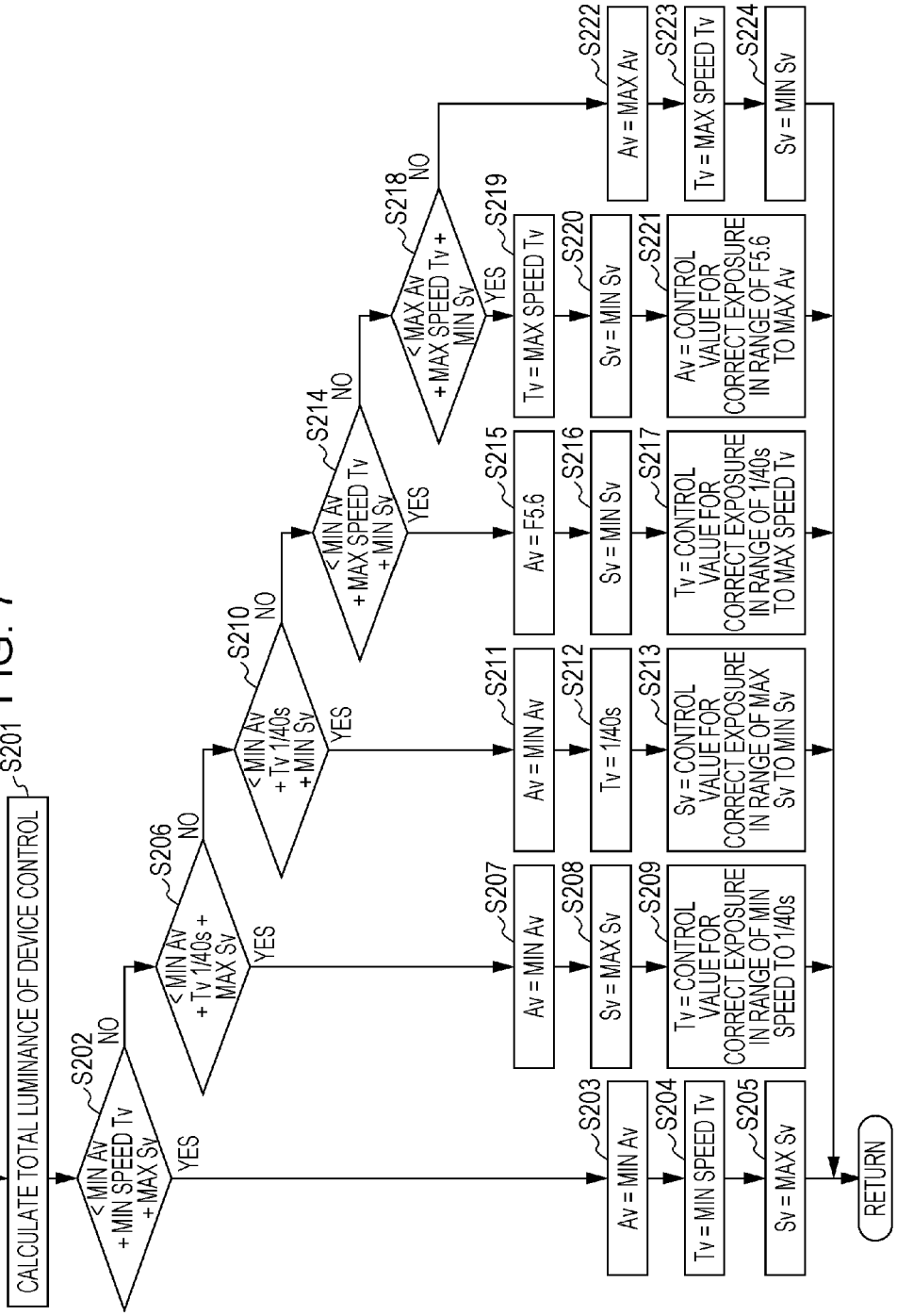
FIG. 7 is a flowchart illustrating an example of a flow of a process of calculating a set of captured-image storage control values.

Further, in step S202 of FIG. 7, it may be determined that the target exposure sum is equal to or more than the reference exposure value in this case and is not less than the lower limit of the controllable range of the imaging apparatus 100. In this case, the exposure sum determination portion 252 advances the process to step S206.

Thereafter, the exposure sum determination portion 252 repeatedly compares the reference exposure value with the target exposure sum while gradually increasing the reference exposure value until the target exposure sum is less than the reference exposure value. That is, the exposure sum determination portion 252 discriminates the magnitude of the target exposure sum. The aperture setting portion 253 to the ISO sensitivity setting portion 255 sets the control value in accordance with the discriminated magnitude of the target exposure sum.

Hereinafter, detailed description will be given.

In step S206, the exposure sum determination portion 252 determines whether or not the target exposure sum is less than the sum (the reference exposure value) of the lower limit of the aperture control value, the hand-shake shutter speed, and the lower limit of the ISO sensitivity (the gain). When it is determined that the target exposure sum is smaller than the reference exposure value in this case, the exposure sum determination portion 252 advances the process to step S207.

In this case, the aperture setting portion 253 sets the aperture control value to the lower limit in step S207. The ISO sensitivity setting portion 255 sets the ISO sensitivity (the gain) to the upper limit (the highest sensitivity) in step S208.

Further, the shutter speed setting portion 254 sets the shutter speed to the value to achieve the correct exposure within the range of the lower limit (the lowest value) to the hand-shake shutter speed (¹/₄₀ seconds) in step S209. That is, the shutter speed setting portion 254 sets the shutter speed to the value obtained by subtracting the aperture control value and the ISO sensitivity (the gain), which are set then, from the target exposure sum.

When the respective control values are set, the captured-image storage control value calculation section 214 terminates the process of calculating the set of captured-image storage control values, returns the process to step S124 of FIG. 5, and advances the process to step S125.

Further, in step S206 of FIG. 7, when it is determined that the target exposure sum is equal to or more than the reference exposure value in this case, the exposure sum determination portion 252 advances the process to step S210.

In step S210, the exposure sum determination portion 252 determines whether or not the target exposure sum is less than the sum of the lower limit of the aperture control value, the hand-shake shutter speed, and the lower limit of the ISO sensitivity (the gain).

When it is determined that the target exposure sum is smaller than the reference exposure value in this case, the exposure sum determination portion 252 advances the process to step S211. In this case, the aperture setting portion 253 sets the aperture control value to the lower limit in step S211. The shutter speed setting unit 254 sets the shutter speed to the hand-shake shutter speed (¹/₄₀ seconds) in step S212.

Further, the ISO sensitivity setting portion 255 sets the ISO sensitivity (the gain) to the value to achieve the correct exposure within the range of the upper limit (the highest sensitivity) to the lower limit (the lowest sensitivity) in step S213. That is, the ISO sensitivity setting portion 255 sets the ISO sensitivity to the value obtained by subtracting the aperture control value and the shutter speed, which are set then, from the target exposure sum.

When the respective control values are set, the captured-image storage control value calculation section 214 terminates the process of calculating the set of captured-image storage control values, returns the process to step S124 of FIG. 5, and advances the process to step S125.

Further, in step S210 of FIG. 7, when it is determined that the target exposure sum is equal to or more than the reference exposure value in this case, the exposure sum determination portion 252 advances the process to step S214.

In step S214, the exposure sum determination portion 252 determines whether or not the target exposure sum is less than the sum of the lower limit of the aperture control value, the upper limit of the shutter speed (the maximum speed), and the upper limit of the ISO sensitivity (the gain) (the highest sensitivity).

When it is determined that the target exposure sum is smaller than the reference exposure value in this case, the exposure sum determination portion 252 advances the process to step S215. In this case, the aperture setting portion 253 sets the aperture control value to a predetermined value (for example, F5.6) in step S215. The ISO sensitivity setting portion 255 sets the ISO sensitivity to the lower limit (the lowest sensitivity) in step S216.

Moreover, the shutter speed setting portion 254 sets the shutter speed control value to the value to achieve the correct exposure within the range of the hand-shake shutter speed (¹/₄₀ seconds) to the upper limit thereof in step S217. That is, the shutter speed setting portion 254 sets the shutter speed to the value obtained by subtracting the aperture control value and the ISO sensitivity (the gain), which are set then, from the target exposure sum.

When the respective control values are set, the captured-image storage control value calculation section 214 terminates the process of calculating the set of captured-image storage control values, returns the process to step S124 of FIG. 5, and advances the process to step S125.

Further, in step S214 of FIG. 7, when it is determined that the target exposure sum is equal to or more than the reference exposure value in this case, the exposure sum determination portion 252 advances the process to step S218.

In step S218, the exposure sum determination portion 252 determines whether or not the target exposure sum is less than the sum of the upper limit of the aperture control value, the upper limit of the shutter speed (the maximum speed), and the lower limit of the ISO sensitivity (the gain) (the lowest sensitivity).

When it is determined that the target exposure sum is smaller than the reference exposure value in this case, the exposure sum determination portion 252 advances the process to step S219. In this case, the shutter speed setting portion 254 sets the shutter speed to the upper limit (the maximum speed) in step S219. The ISO sensitivity setting portion 255 sets the ISO sensitivity (the gain) to the lower limit (the lowest sensitivity) in step S220.

Further, the aperture setting portion 253 sets the aperture control value to the value to achieve the correct exposure within the range of the predetermined value (for example, F5.6) to the upper limit in step S221. That is, the aperture setting portion 253 sets the aperture control value to the value obtained by subtracting the shutter speed and the ISO sensitivity (the gain), which are set then, from the target exposure sum.

When the respective control values are set, the captured-image storage control value calculation section 214 terminates the process of calculating the set of captured-image storage control values, returns the process to step S124 of FIG. 5, and advances the process to step S125.

Further, in step S218 of FIG. 7, when it is determined that the target exposure sum is equal to or more than the reference exposure value in this case, the exposure sum determination portion 252 advances the process to step S222.

In this case, the target exposure sum is out of the allowable range. The aperture setting portion 253 sets the aperture control value to the upper limit in step S222. The shutter speed setting unit 254 sets the shutter speed to the upper limit (the maximum speed) in step S223. The ISO sensitivity setting portion 255 sets the ISO sensitivity (the gain) to the lower limit (the lowest sensitivity) in step S224.

When the respective control values are set, the captured-image storage control value calculation section 214 terminates the process of calculating the set of captured-image storage control values, returns the process to step S124 of FIG. 5, and advances the process to step S125.

The captured-image storage control value calculation section 214 is able to calculate the control values appropriate for the captured image by requesting the respective control values of the captured-image storage control value set in the above-mentioned procedure.

It should be noted that the flow of the process mentioned above is an example in the case of focusing on an increase in shutter speed and focusing on capturing an image of which the depth of field is shallow. Such a flow of the process is preferably used in the following exemplary cases: a user selects a mode for taking an image, of which the depth of field is generally shallow, such as a portrait or a macro through the scene selection mode; and it is determined that the user wants to take an image, of which the depth of field is shallow, including a portrait and a macro by using a camera when the camera is set in the automatic control mode.

It is apparent that the flow of the process of calculating the set of captured-image storage control values may be modified from the above description. For example, the condition at each turning point may be changed by preferentially changing the aperture when it is detected that the target exposure sum is larger than the lower limit of the allowable range. In this case, the flow of the process may be configured so as to focus on a decrease in the aperture. Such a flow of the process is preferably used in the following exemplary cases: a user selects the landscape mode through the scene selection mode; and it is determined that the user wants to take an image, of which the depth of field is deep, including a landscape by using a camera when the camera is set in the automatic control mode.

It is also apparent that the process of calculating the set of captured-image storage control values may be performed in an optional procedure other than the above-mentioned flows.

Flow of Process of Correcting Control Values

Figure 8:
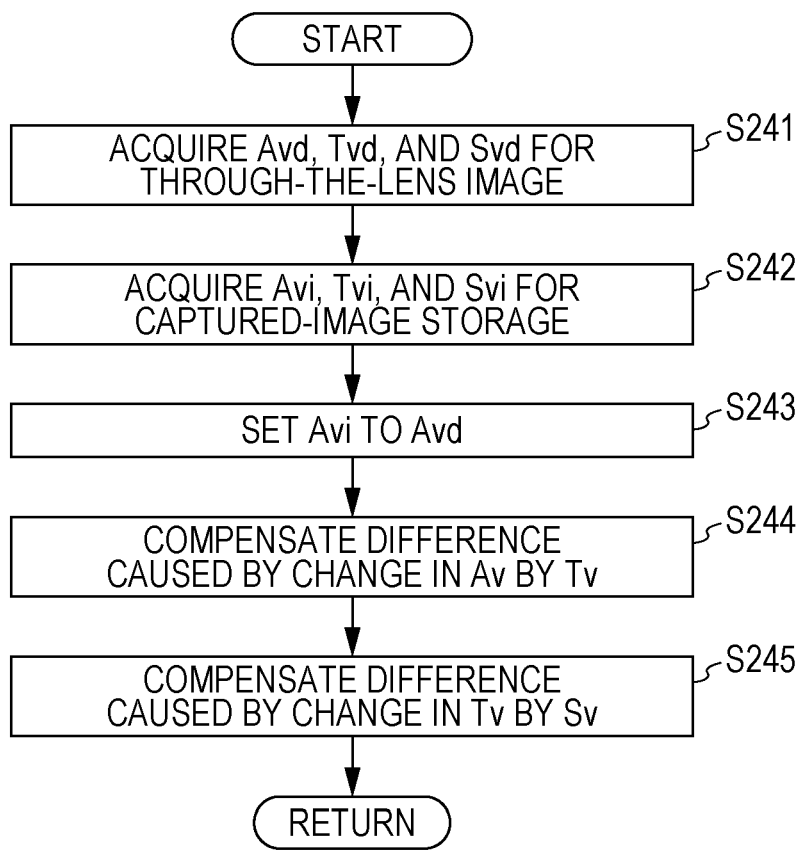
FIG. 8 is a flowchart illustrating an example of a flow of a process of correcting control values.

Next, referring to the flowchart of FIG. 8, description will be given of an example of the flow of the process of correcting the control values which is executed in step S128 of FIG. 5.

Hereinafter, Avd represents the aperture control value for the through-the-lens image, Tvd represents the shutter speed (the exposure time) for the through-the-lens image, and Svd represents the ISO sensitivity (the gain) for the through-the-lens image. That is, Avd, Tvd, and Svd are calculated through the process of calculating the set of through-the-lens image control values executed in step S123 of FIG. 5.

Further, Avi represents the aperture control value for the captured-image storage, Tvi represents the shutter speed (the exposure time) for the captured-image storage, and Svi represents the ISO sensitivity (the gain) for the captured-image storage. That is, Avi, Tvi, and Svi calculated through the process of calculating the set of captured-image storage control values executed in step S124 of FIG. 5.

When the process of correcting the control values starts, the control value correction section 217 (FIG. 2) of the image capturing control section 205 acquires, in step S241, the aperture control value Avd, the shutter speed Tvd, and the ISO sensitivity Svd for the through-the-lens image from the retained location (for example, the RAM 123, the storage unit 127, and the like). The control value correction section 217 further acquires, in step S242, the aperture control value Avi, the shutter speed Tvi, and the ISO sensitivity Svi for the captured-image storage from the retained location (for example, the RAM 123, the storage unit 127, and the like).

In step S243, the control value correction section 217 sets the aperture control value for the captured-image storage Avi to the aperture control value for the through-the-lens image Avd. That is, assuming that the updated Avd is Avd', Avd'=Avi.

In step S244, the control value correction section 217 compensates the exposure difference, which is caused by updating the aperture control value Av, by the shutter speed Tv as represented by the following expression.

$$Tvd' = Tvd + (Avd - Avd')$$
$$= Tvd + (Avd - Avi)$$

In step S245, the control value correction section 217 compensates the exposure difference, which is caused by updating the shutter speed Tv, by the ISO sensitivity Sv as represented by the following expression.

$$Svd' = Svd + (Tvd - Tvd')$$
$$= Svd - (Avd - Avi)$$

When the respective control values are corrected in the above-mentioned manner, the control value correction section 217 terminates the process of correcting the control values, returns the process to step S128 of FIG. 5, and advances the process to step S129.

As described above, the value for the captured-image storage (Avi) is used in the aperture control value Av, and thus it is possible for the user to more accurately check the depth of field at the time of the captured-image storage in the through-the-lens image. Further, in the shutter speed Tv and the ISO sensitivity Sv, the values, which are obtained by correcting the values for the through-the-lens image (Tvd and Svd), are used. Accordingly, even when the shutter speed (Tvi) and the ISO sensitivity (Svi) for the captured-image storage are inappropriate for the through-the-lens image, the image capturing control section 205 is able to set the respective control values to appropriate values.

In the above description, the depth of field is preferentially made to be checked by a user, and thus the shutter speed Tv and the ISO sensitivity Sv are corrected on the basis of the aperture control value for the captured-image storage Avi. However, it is apparent that the correction process may be performed by using other optional methods.

2. Second Embodiment

Configuration of Control CPU

In the description of the first embodiment mentioned above, both of the set of through-the-lens image control values and the set of captured-image storage control values are calculated, and either one of them is selected and used depending on the situation. However, the embodiment of the invention is not limited to this. For example, depending on the situation, either one of the set of through-the-lens image control values or the set of captured-image storage control values may be calculated.

Figure 9:
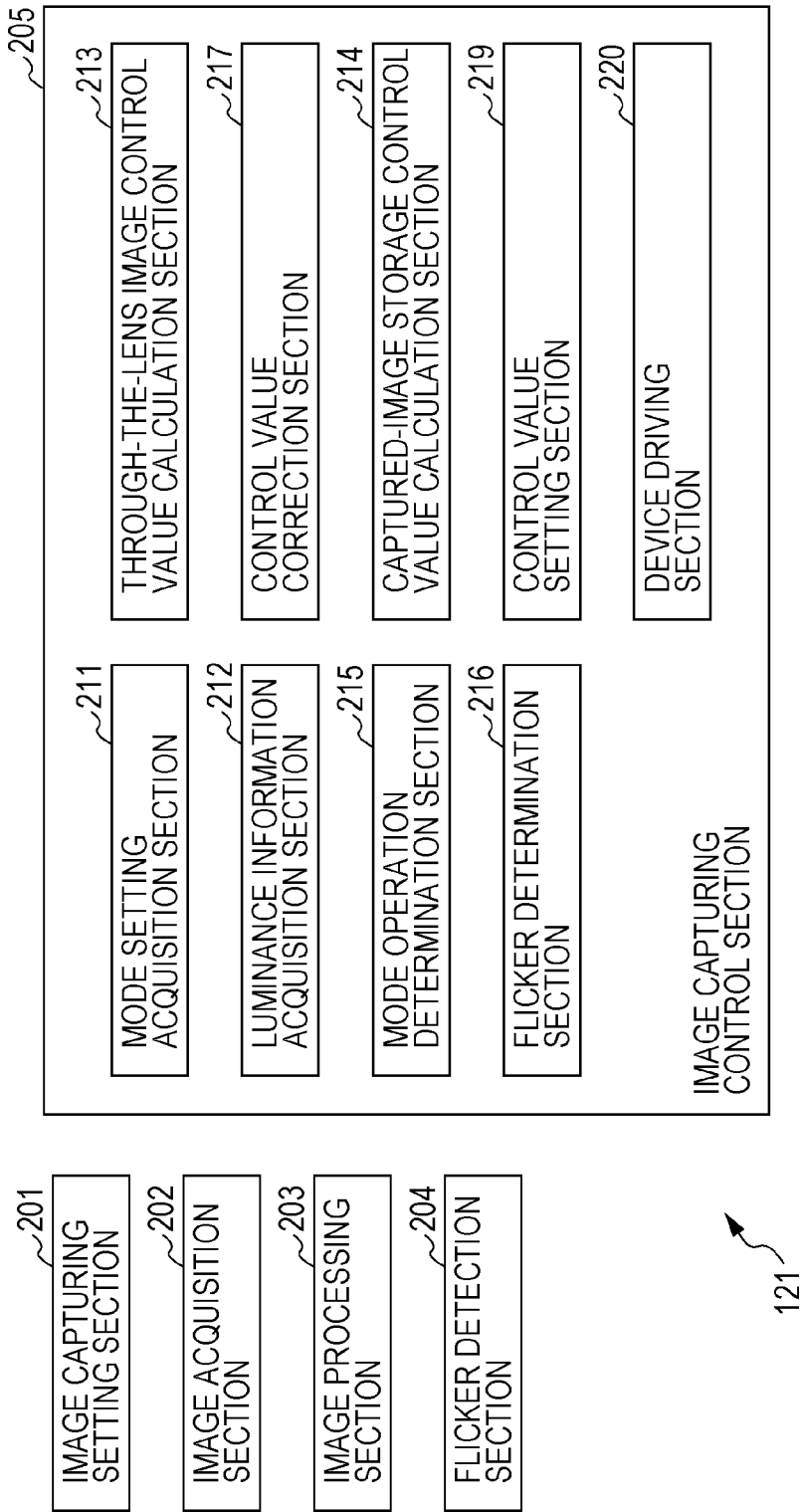
FIG. 9 is a functional block diagram illustrating another configuration example of the control CPU of FIG. 1.

FIG. 9 is a diagram illustrating a main configuration example of functional blocks belonging to the control CPU 121 in such a case.

As shown in FIG. 9, the control CPU 121 basically has the same configuration as the case of the first embodiment (FIG. 2). However, in the case of FIG. 9, in the image capturing control section 205, the control value selection section 218, which is present in the case of FIG. 2, can be omitted.

Flow of Control Process

An example of a flow of the control process in this case will be described with reference to the flowchart of FIG. 10.

Figure 10:
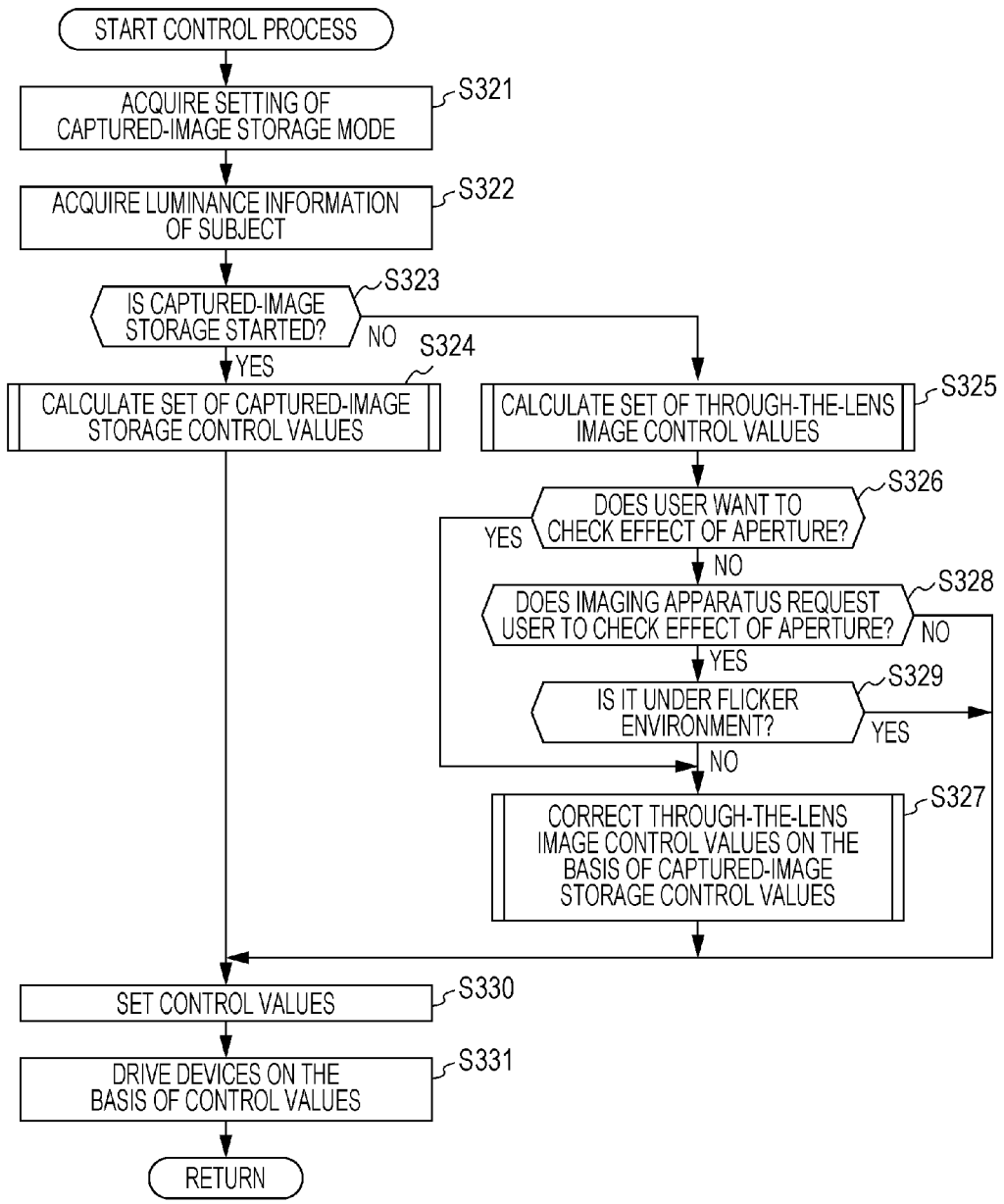
FIG. 10 is a flowchart illustrating another example of the flow of the control process.

As shown in FIG. 10, in this case also, the control process is executed basically similarly to the case (FIG. 5) of the first embodiment.

However, the processes of calculating the set of control values in step S123 and step S124 will be omitted. That is, in step S321, the mode setting acquisition section 211 acquires the captured-image storage mode setting similarly to the case of step S121. Then, in step S322, the luminance information acquisition section 212 acquires the luminance information of the subject similarly to the case of step S122. Thereafter, in step S323, the mode operation determination section 215 determines whether or not the captured-image storage starts similarly to the case of step S125.

When it is determined to start the captured-image storage, in step S324, the captured-image storage control value calculation section 214 performs, instead of the process of step S126, the process of calculating the set of captured-image storage control values similar to the case of step S124, thereby calculating the set of captured-image storage control values.

Further, in step S323, when it is determined not to start the captured-image storage, the through-the-lens image control value calculation section 213 performs the process of calculating the set of through-the-lens image control values similarly to the case of step S123 in step S325, thereby calculating the set of through-the-lens image control values.

After the set of through-the-lens image control values is calculated, the mode operation determination section 215 determines whether or not the user wants to check the effect of the aperture similarly to the case of step S127 in step S326.

On the basis of the captured-image storage mode, the user operation, or the like, it may be determined that the user wants to check the effect of the aperture. In this case, the control value correction section 217 performs the process of correcting the control values similarly to the case of step S128 in step S327, thereby correcting the through-the-lens image control values on the basis of the captured-image storage control values. In this case, since other sets of the control values are not created, the control values are corrected, and thereby the corrected control values are selected. That is, the process of step S129 is omitted.

Further, in step S326, it may be determined that the user does not want to check the effect of the aperture. In this case, the mode operation determination section 215 determines whether or not the imaging apparatus 100 intends to make the user check the effect of the aperture similarly to the case of step S130 in step S328.

When it is determined that the apparatus intends to do that, the flicker determination section 216 determines whether or not the subject is under the flicker condition similarly to the case of step S131 in step S329. When it is determined that flicker does not occur in the through-the-lens image, the process returns to step S327.

In step S329, when it is determined that flicker occurs in the through-the-lens image, the flicker determination section 216 advances the process to step S330. Further, in step S328, when it is determined that the imaging apparatus 100 does not intend to make the user check the effect of the aperture, the mode operation determination section 215 advances the process to step S330.

In such a case, since other sets of the control values are not created, the set of through-the-lens image control values calculated in step S325 is selected. Accordingly, the process of step S132 is omitted.

In step S330, the control value setting section 219 sets, similarly to the case of step S133, the respective created control values. In step S331, the device driving section 220 drives, similarly to the case of step S134, the devices such as the lens unit 101 to the imaging element 103 in accordance with the control values which are set through the process of step S330.

When the process of step S331 is terminated, the image capturing control section 205 terminates the control process, returns the process to step S105 of FIG. 4, and advances the process to step S106.

In such a manner, it is possible to create only the necessary sets of control values. As a result, the image capturing control section 205 is able to reduce the load of the entire control process.

However, in the case of the second embodiment, after the captured-image storage mode or the user operation is determined, the control values should be created. In contrast, in the case of the first embodiment, both of the captured-image storage control values and the through-the-lens image control values are created. Therefore, it suffices to select either one thereof depending on the determination result of the captured-image storage mode or the user operation. Consequently, the control process (FIG. 5) of the first embodiment is able to further improve the quick reaction capability of the device control as compared with the control process (FIG. 10) of the second embodiment.

In addition, in the description of the flowcharts of FIG. 5 and FIG. 10, when the user presses the shutter button fully, it is determined that the captured-image storage starts. However, for example, when the user presses the shutter button halfway, it may be assumed that the user wants to get an image equivalent to that at the time of the captured-image storage. In this case, similarly to the case of the captured-image storage, by advancing the process to step S126, the control may be performed on the basis of the captured-image storage control values. For example, while the user presses the shutter button halfway, the through-the-lens image may be formed as the still image.

As might be expected, it may be assumed that the user's intention is different depending on whether the operation is the half-press operation or the full-press operation. When the user presses the shutter button halfway, by advancing the process to step S132, the control may be performed on the basis of the through-the-lens image control values. Alternatively, by advancing the process to step S128, the control may be performed on the basis of the values which are obtained by correcting the through-the-lens image control values on the basis of the captured-image storage control values.

The above-mentioned series of the processes may be executed through hardware, or may be executed through software. When the above-mentioned series of processes are executed through software, the programs constituting the software are installed from the network or a recording medium.

Examples of the recording media include, as shown in FIG. 1, separately from the apparatus main body, a magnetic disk (including the flexible disk) that stores programs and is distributed so that the programs are sent to an administrator of the imaging apparatus 100, an optical disc (including the CD-ROM and DVD), a magneto optical disc (including the MD (Registered Trademark)), and the removable medium 152 formed by the semiconductor memory or the like. Besides, examples of the recording media also include the ROM 122 that stores programs which are sent to the administrator in a state of being already installed in the apparatus main body, a hard disk included in the storage unit 127, and the like.

In the present specification, the steps of the programs stored in the recording medium include not only processes which are performed chronologically, but also processes which are not performed chronologically, such as processes which are performed in parallel or individually.

Further, the single device (or the processing unit) in the above description may be configured as plural devices (or processing units). On the contrary, the plural devices (or the processing units) in the above description may be collectively configured as a single device (or a processing unit). Further, it is apparent that a configuration other than the above-mentioned configuration may be added to the configuration of each device (or each processing unit). Furthermore, if overall configurations and operations of systems are practically the same as each other, a part of a configuration of a certain device (or a processing unit) may be included in a configuration of a different device (or a different processing unit). That is, the embodiments of the invention are not limited to the above-mentioned embodiments, and may be modified into various forms without departing from the technical scope of the invention.

The embodiments of the invention may be applied to any of the apparatuses and systems if the apparatuses and systems have an image capturing function. For example, the apparatuses and systems include digital cameras, digital video cameras, mobile phones, smart phones, PDAs (Personal Digital Assistants), UMPCs (Ultra Mobile Personal Computer), laptop personal computers, monitoring imaging systems, medical imaging systems, traffic management systems, and the like.

The present application contains subject matter related to that disclosed in Japanese Priority Patent Application JP 2010-053140 filed in the Japan Patent Office on Mar. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
   circuitry configured to
   capture an image of a subject,
   determine whether or not to enable a user to check an effect of an aperture of a captured image for storage in a through-the-lens image,
   based on a determination of whether the subject is under a flicker condition, control exposure of the through-the-lens image between exposure appropriate for the through-the-lens image and exposure for the captured image for storage, which is different than the exposure appropriate for the through-the-lens image, when a determination is made to enable the user to check the effect of the aperture of the captured image for storage in the through-the-lens image, and
   control exposure of the through-the-lens image to the exposure appropriate for the through-the-lens image when a determination is made to not enable the user to check the effect of the aperture of the captured image for storage in the through-the-lens image.

2. The imaging apparatus of claim 1, wherein the circuitry is further configured to control exposure of the through-the-lens image to suppress occurrence of flicker in the through-the-lens image when a determination is made to not enable the user to check the effect of the aperture of the captured image for storage in the through-the-lens image.

3. The imaging apparatus of claim 1, wherein the circuitry is further configured to control exposure of the captured image for storage regardless of a result of the determination of whether or not to enable the user to check the effect of the aperture in the through-the-lens image.

4. The imaging apparatus of claim 1, wherein the circuitry is further configured to determine whether or not to enable the user to check the effect of the aperture according to a selected image capture mode.

5. The imaging apparatus of claim 4, wherein the circuitry is further configured to enable manual selection of the image capture mode.

6. The imaging apparatus of claim 4, wherein the circuitry is further configured to enable automatic selection of the image capture mode.

7. The imaging apparatus of claim 1, wherein the circuitry is further configured to detect flicker in the through-the-lens image, and to control exposure of the through-the-lens image to be the exposure for the captured image for storage when flicker is not detected and a determination is made to enable the user to check the effect of the aperture in the through-the-lens image.

8. A method for controlling exposure of an imaging apparatus, comprising acts of:
   determining whether or not to enable a user to check an effect of an aperture of a captured image for storage in a through-the-lens image;
   based on a determination of whether the subject is under a flicker condition, controlling exposure of the through-the-lens image between exposure appropriate for the through-the-lens image and exposure for the captured image for storage, which is different than the exposure appropriate for the through-the-lens image, when a determination is made to enable the user to check the effect of the aperture of the captured image for storage in the through-the-lens image; and
   controlling exposure of the through-the-lens image to the exposure appropriate for the through-the-lens image when a determination is made to not enable the user to check the effect of the aperture of the captured image for storage in the through-the-lens image.

* * * * *